(12) United States Patent
Taira

(10) Patent No.: US 8,096,881 B2
(45) Date of Patent: Jan. 17, 2012

(54) STORAGE MEDIUM STORING GAME PROGRAM AND GAME APPARATUS

(75) Inventor: Masayuki Taira, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1039 days.

(21) Appl. No.: 11/657,078

(22) Filed: Jan. 24, 2007

(65) Prior Publication Data

US 2008/0132339 A1    Jun. 5, 2008

(30) Foreign Application Priority Data

Dec. 1, 2006   (JP) ................................. 2006-326233

(51) Int. Cl.
*A63F 13/06* (2006.01)

(52) U.S. Cl. ................................ 463/36; 463/7; 463/37

(58) Field of Classification Search .............. 273/148 B, 273/148 R; 463/1, 7, 8, 30, 31, 36–39, 43, 463/47; 345/156–167; 702/79, 80, 176–178, 702/189

See application file for complete search history.

(56) References Cited

U.S. PATENT DOCUMENTS

| | | | |
|---|---|---|---|
| 5,059,958 A * | 10/1991 | Jacobs et al. ................... 345/158 |
| 5,585,584 A | 12/1996 | Usa |
| 5,663,514 A | 9/1997 | Usa |
| 6,183,365 B1 | 2/2001 | Tonomura et al. |
| 7,351,148 B1 * | 4/2008 | Rothschild et al. ............. 463/30 |
| 2002/0065121 A1 * | 5/2002 | Fukunaga et al. ................ 463/8 |
| 2005/0085298 A1 * | 4/2005 | Woolston ......................... 463/37 |
| 2005/0143173 A1 * | 6/2005 | Barney et al. ................... 463/37 |
| 2005/0176485 A1 * | 8/2005 | Ueshima ........................... 463/4 |
| 2006/0142082 A1 | 6/2006 | Chiang et al. |
| 2007/0118241 A1 * | 5/2007 | Rosenberg ...................... 700/94 |
| 2008/0174550 A1 * | 7/2008 | Laurila et al. ................. 345/158 |

FOREIGN PATENT DOCUMENTS

| JP | 2000-308756 | 11/2000 |
|---|---|---|
| WO | WO 01/24896 | 4/2001 |

* cited by examiner

*Primary Examiner* — Dmitry Suhol
*Assistant Examiner* — Jay Trent Liddle
(74) *Attorney, Agent, or Firm* — Nixon & Vanderhye P.C.

(57) ABSTRACT

Output data varying depending on a motion of an input device itself is obtained and stored into a memory. From the stored output data history, successive extremums of values indicated by the output data are detected. An interval between times when the output data indicating the successive extremums and an elapsed time from the detection of the extremum is measured. Thereafter, game input data is calculated by substituting into a predetermined function the measured elapsed time and the calculated time interval, and the game input data is used to execute a game process.

28 Claims, 20 Drawing Sheets

F I G. 7
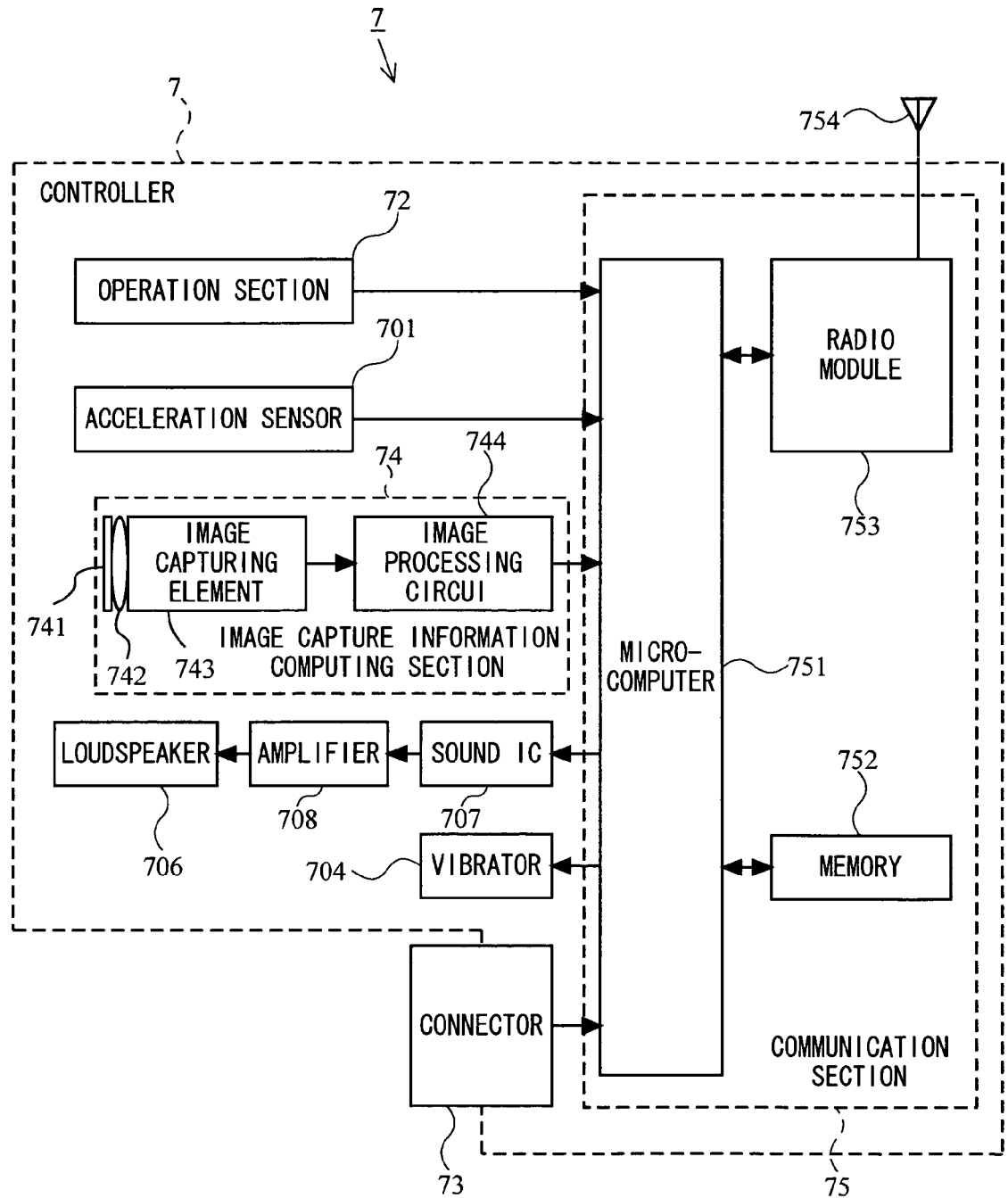

STORAGE MEDIUM STORING GAME PROGRAM AND GAME APPARATUS

CROSS REFERENCE TO RELATED APPLICATION

The disclosure of Japanese Patent Application No. 2006-326233, filed Dec. 1, 2006, is incorporated herein by reference.

BACKGROUND

1. Field of the Technology

The technology presented herein relates to a storing medium storing a game program and a game apparatus. More particularly, the present technology relates to a storing medium storing a game program for executing a game process, depending on a motion of an input device itself, and a game apparatus.

2. Description of the Background Art

Conventionally, there are games in which a motion of swinging a stick-like object, such as a golf club, a baseball bat, or the like, is input (e.g., a golf game, a baseball game, etc.). In these games, a button or a lever which utilizes a switch is used as a controller for inputting the motion of swinging the stick-like object.

Alternatively, for example, Japanese Laid-Open Patent Publication No. 2000-308756 (hereinafter referred to as Patent Document 1) discloses a stick-shaped controller (input control device) for inputting a swing motion instead of the button or lever. The controller disclosed in Patent Document 1 comprises an acceleration sensor. A player holds the stick-like controller and actually performs a swing motion. For example, in a 3D game which provides a sense of swordplay, a stick-like controller is assumed to be a sword, and the player moves the controller as if the player swung a sword. In this case, data corresponding to the player's motion is output from the acceleration sensor included in the controller. Movement data of the sword in a game space is determined based on data output from the acceleration sensor, and a motion of a player object swinging the sword in accordance with the player's motion is displayed as a game image.

However, the input control device (controller) disclosed in Patent Document 1 may not follow a motion of the player swinging the input control device. For example, when the stick-like controller is rapidly swung by the player, the rapidness of the swing motion exceeds the detection speed of the acceleration sensor or the speed of computing output data, so that movement data indicating a motion which is different from an actual player's operation may be obtained. Therefore, a motion intended by the player is not expressed, so that a motion which is significantly different from a player's motion or a motion on which a player's motion is not reflected at all may be expressed, thereby making a game less exciting.

SUMMARY

Therefore, a feature of an example embodiment presented herein is to provide a storage medium storing a game program for executing a game process on which a motion of an input device itself is appropriately reflected, and a game apparatus.

The present embodiment has the following features to attain the above. Note that reference numerals, step numbers and the like inside parentheses indicate correspondence to embodiments described below for the sake of easy understanding, and do not limit the present invention.

A first aspect of the example embodiment is directed to a storage medium storing a game program executed by a computer (30) in a game apparatus (5) for executing a game. The game program causes the computer to function as an output data obtaining means (a CPU 30 for executing step 17; hereinafter only a step number is described), an output data storing means (S17), a peak value detecting means (S81), a peak interval calculating means (S81), a measurement means (S81), a game input data calculating means (S92), and a game processing means (S22). The output data obtaining means obtains output data (Da) varying depending on a motion of an input device (7) itself. The output data storing means stores a history of the output data obtained by the output data obtaining means into a memory (33). The peak value detecting means detects successive extremums of values from the output data history (AccBuffer) stored in the output data storing means. The peak interval calculating means calculates a time interval (Index[Ms+1]−Index[Ms]) between times when the output data indicating the successive extremums have been obtained, based on the detection of the peak value detecting means. The measurement means measures a time (Index[Ms]) which has elapsed since the detection of the extremum by the peak value detecting means. The game input data calculating means calculates game input data (θc) by substituting into a predetermined function the elapsed time measured by the measurement means and the time interval calculated by the peak interval calculating means. The game processing means executes a game process using the game input data calculated by the game input data calculating means.

Note that the peak value detecting means may detect both maximum values and minimum values, only maximum values, or only minimum values. The peak value detecting means may repeatedly detect extremums.

The peak interval calculating means may calculate a time interval between a maximum value and a minimum value, a time interval maximum values, or a time interval between minimum values. Here, the peak interval calculating means may calculate the time interval at least one time, or alternatively, may repeatedly calculate the time interval a plurality of times. For example, the time interval may be calculated every time the peak value detecting means detects an extremum, or may be calculated under a predetermined condition (e.g., when a maximum value and/or a minimum value has been detected a predetermined number of times, when a predetermined time has elapsed, etc.). When the output data obtaining means obtains output data in predetermined time intervals, the peak interval calculating means can calculate the time interval using the interval in the output data is obtained. If otherwise, output time data (history) of the output data is stored, and based on the time data, the time interval can be calculated.

When the peak value detecting means repeatedly executes detection of extremums, the measurement means may measure a time which has elapsed since the peak value detecting means detected a most recent extremum. Alternatively, when the peak value detecting means has detected an extremum satisfying a predetermined condition, the measurement means may measure a time which has elapsed since the detection.

When the peak interval calculating means repeatedly calculates the time interval, the game input data calculating means may use a latest time interval calculated by the peak interval calculating means.

In a second aspect, the peak value detecting means repeatedly detects the extremum. The peak interval calculating means calculates a time interval between a latest extremum detected by the peak value detecting means and an extremum detected immediately previously to the latest extremum, every time the peak value detecting means detects the extremum. The measurement means measures a time which has elapsed since a time point when the peak value detecting means detected the latest extremum. The game input data calculating means calculates the game input data using the latest time interval calculated by the peak interval calculating means.

For example, every time the output data obtaining means obtains output data, the output data storing means stores the obtained output data into a memory. The peak value detecting means executes detection of an extremum every time the output data is stored into the memory.

In a third aspect, the game input data calculating means sets as the predetermined function a cyclic function simulating transition of values indicated by the output data history which vary while successively repeating the maximum value and the minimum value with cyclicality.

In a fourth aspect, the predetermined function used by the game input data calculating means repeatedly takes an extremum every time a variable is changed by T where T is a cycle, and takes an extremum when a predetermined value is substituted. The game input data calculating means calculates the game input data by substituting into the predetermined function a value obtained by adding the predetermined value to a value obtained by multiplying T by a ratio of the elapsed time to the time interval.

In a fifth aspect, the predetermined function used by the game input data calculating means is a function which repeatedly takes a maximum value and a minimum value alternately every time a variable is changed by T/2 where T is a cycle. The peak value detecting means detects both the maximum value and the minimum value. The peak interval calculating means calculates a time interval between the successive maximum value and minimum value. The game input data calculating means calculates the game input data by substituting into the predetermined function a value obtained by adding a predetermined value to a value obtained by multiplying T/2 by a ratio of the elapsed time to the time interval.

In a sixth aspect, the predetermined function of the game input data calculating means is a function which takes a maximum value or a minimum value when a predetermined value is substituted. The peak value detecting means repeatedly detects the maximum value and the minimum value. The peak interval calculating means calculates a time interval between a latest maximum value detected by the peak value detecting means and a minimum value detected immediately previously to the latest maximum value or between a latest minimum value detected by the peak value detecting means and a maximum value detected immediately previously to the latest minimum value, every time the peak value detecting means detects either the maximum value or the minimum value. The measurement means measures a time which has elapsed since a time point at which the peak value detecting means detected the latest maximum or minimum value. The game input data calculating means calculates the game input data using the latest time interval calculated by the peak interval calculating means, and when the latest extremum detected by the peak value detecting means is a minimum value, inverts the sign of the calculated game input data.

In a seventh aspect, the predetermined function used by the game input data calculating means is a sine function. The peak value detecting means detects either a maximum or a minimum value. The peak interval calculating means calculates either a time interval between successive maximum values or a time interval between successive minimum values. The game input data calculating means calculates the game input data by substituting a value obtained by multiplying 360 degrees by the ratio into the sine function.

In an eighth aspect, the predetermined function used by the game input data calculating means is a sine function. The game input data calculating means calculates the game input data by substituting a value obtained by multiplying 180 degrees by the ratio into the sine function.

In a ninth aspect, the predetermined function used by the game input data calculating means is a cosine function. The peak value detecting means detects either a maximum or a minimum value. The peak interval calculating means calculates either a time interval between successive maximum values or a time interval between successive minimum values. The game input data calculating means calculates the game input data by substituting into the cosine function a value obtained by adding or subtracting $n*\pi$ (n is a natural number) to or from a value obtained by multiplying 360 degrees by the ratio.

In a tenth aspect, the predetermined function used by the game input data calculating means is a cosine function. The game input data calculating means calculates the game input data by substituting into the cosine function a value obtained by adding or subtracting $n*180$ degrees (n is a natural number) to or from a value obtained by multiplying $\pi$ by the ratio.

In an eleventh aspect, the input device includes an acceleration detecting section (701) for detecting accelerations generated in at least two directions, and outputting a result of the detection as output data. The output data obtaining means obtains data indicating accelerations generated in two directions based on the output data output from the acceleration detecting section.

In a twelfth aspect, the game is a game in which a player performs an operation of reciprocatingly tilting the input device. One of the at least two directions in which accelerations are detected by the acceleration detecting section, is a direction in which, when the player performs the operation of reciprocatingly tilting the input device, an acceleration is generated due to an operational force of the operation.

In a thirteenth aspect, the game is a game in which a player performs an operation of reciprocatingly tilting the input device. One of the at least two directions in which accelerations are detected by the acceleration detecting section, is a tangential direction of an arc which is a trajectory of movement of a predetermined portion of the input device by the operation of reciprocatingly tilting the input device performed by the player.

In a fourteenth aspect, when the peak value detecting means has detected n (n is an integer of 2 or more) extremums, the game input data calculating means calculates the game input data by substituting into the predetermined function the elapsed time measured by the measurement means and the time interval calculated by the peak interval calculating means. When the peak value detecting means has not detected n extremums, the game input data calculating means calculates angle data indicating an angle of the input device with respect to a direction of gravity acting on the input device based on the accelerations generated in the two directions indicated by the output data, and the angle data is the game input data.

In a fifteenth aspect, the game is a game in which the input device is reciprocatingly tilted while the input device is disposed so that the two directions are present in a vertical plane in a real space.

Here, the example embodiment presented herein is typically applicable in a game in which the player performs an operation reciprocatingly varying a tilt of the input device with respect to the gravity direction. More specifically, the input device is held so that the "two directions" in the fourteenth and fifteenth aspects are present in the vertical plane in the real space, and the input device is tilted while keeping both first and second directions present in the vertical plane. Typically, such an operation is explicitly or implicitly instructed in an instruction manual or on a screen, and the player performs an operation in accordance with the instruction. The "two directions" may be perpendicular to each other. For example, the two directions are typically any two of a frontward direction of the input device (a Z-axis positive direction in FIG. 3 described below), a rearward direction (a Z-axis negative direction in FIG. 3 described below), an upward direction (a Y-axis positive direction in FIG. 3 described below), a downward direction (a Y-axis negative direction in FIG. 3 described below), a leftward direction (an X-axis positive direction in FIG. 3 described below), and a rightward direction (an X-axis negative direction in FIG. 3 described below). Note that the front-to-rear direction, the vertical direction, and the lateral direction (three directions) are perpendicular to each other in the input device. Any of the front-to-rear direction, the vertical direction, and the lateral direction is specified when the player holds the input device with its reference attitude, and typically, is a direction which is specified in accordance with a shape of a housing of the input device. When the input device has an elongated shape, a longitudinal direction of the input device may be one of the two direction while a widthwise direction of the input device may be the other direction. Further, the input device may be extended in the longitudinal direction, and may be held by causing a palm to contact a surrounding surface of the input device around a longitudinal direction axis. In this case, the longitudinal direction may be one of the two directions while a direction perpendicular to the longitudinal direction may be the other direction.

In a sixteenth aspect, the game program causes the computer to further function as a determination means. The determination means determines whether or not the elapsed time measured by the measurement means reaches a value larger than or equal to n (n>1) times the time interval calculated by the peak interval calculating means. When a result of the determination by the determination means is positive, the game input data calculating means calculates angle data indicating an angle of the input device with respect to a direction of gravity acting on the input device based on the accelerations generated in the two directions indicated by the output data, and the angle data is the game input data.

In a seventeenth aspect, the predetermined function used by the game input data calculating means is a sine function or a cosine function having a cycle which is half of the time interval calculated by the peak interval calculating means.

In an eighteenth aspect, the peak value detecting means detects both a maximum value and a minimum value. The game program causes the computer to further function as a difference calculating means (S88). The difference calculating means calculates a difference between the maximum value and the minimum value detected by the peak value detecting means. The predetermined function used by the game input data calculating means is a cyclic function whose amplitude has a value based on the difference value calculated by the difference calculating means.

In a nineteenth aspect, the game is a game in which a player performs an operation of reciprocatingly tilting the input device. The game program causes the computer to further function as an end determining means (S87). The end determining means determines that the operation of reciprocatingly tilting the input device has been ended, when the elapsed time measured by the measurement means reaches a predetermined value (1.5 or more) times the time interval calculated by the peak interval calculating means.

In a twentieth aspect, the game program causes the computer to further function as an attitude calculating means (S18). The attitude calculating means calculates an attitude ($\theta s$) of the input device itself using a value indicated by latest output data obtained by the output data obtaining means when the end determining means determines that the operation of reciprocatingly tilting the input device has been ended (Cfrg=false). The game input data calculating means calculates the game input data using the attitude calculated by the attitude calculating means when the end determining means determines that the operation of reciprocatingly tilting the input device has been ended.

In a twenty-first aspect, the game is a game in which a player performs an operation of reciprocatingly tilting the input device. The game program causes the computer to further function as a stop determining means (S83, S86). The stop determining means determines that the operation of reciprcatively tilting the input device is not being performed, when the peak value detecting means has detected one or less extremum.

In a twenty-second aspect, the game program causes the computer to further function as an attitude calculating means. The attitude calculating means calculates an attitude of the input device itself using a value indicated by latest output data obtained by the output data obtaining means when the stop determining means determines that the operation of reciprocatingly tilting the input device is not being performed (Cfrg=false). The game input data calculating means calculates the game input data using the attitude calculated by the attitude calculating means when the stop determining means determines that the operation of reciprocatingly tilting the input device is not being performed.

In a twenty-third aspect, the game processing means varies a tilt ($\theta obj$) of an object in a virtual game world using the game input data. The game program causes the computer to further function as a display control means (S23). The display control means tilts the object in the virtual game world, depending on the tilt of the object varied by the game processing means, and displays the tilted object on a display device (2).

In a twenty-fourth aspect, the game processing means changes an influential power on a surrounding environment, the influential power being generated by movement of an object in a virtual game world using the game input data, so as to provide a predetermined influence on another object in the virtual game world, depending on the influential power.

A twenty-fifth aspect of the example embodiment is directed to a game apparatus for executing a game. The game apparatus comprises an output data obtaining means, an output data storing means, a peak value detecting means, a peak interval calculating means, a measurement means, a game input data calculating means, and a game processing means. The output data obtaining means obtains output data varying depending on a motion of an input device itself. The output data storing means stores a history of the output data obtained by the output data obtaining means into a memory. The peak value detecting means detects successive extremums of values from the output data history stored in the output data storing means. The peak interval calculating means calculates a time interval between times when the output data indicating the successive extremums have been obtained, based on the detection of the peak value detecting means. The measurement means measures a time which has elapsed since the detection of the extremum by the peak value detecting means.

The game input data calculating means calculates game input data by substituting into a predetermined function the elapsed time measured by the measurement means and the time interval calculated by the peak interval calculating means. The game processing means executes a game process using the game input data calculated by the game input data calculating means.

According to the first aspect, it is possible to execute a game process on which a motion of an input device is appropriately reflected, depending on an operation of a player swinging the input device. Therefore, the game process is executed, depending on a motion intended by the player. Therefore, the enjoyment of a game can be improved by a process which is executed in synchronization with a swing motion of the player.

According to the second aspect, game input data simulating an actual swing operation can be calculated based on an elapsed time from a most recent extremum.

According to the third aspect, when the player regularly swings the input device, game input data matching an actual player's swing operation can be obtained by simulating the transition between a maximum value and a minimum value using the cyclicality of values indicated by output data output by the swing motion.

According to the fourth aspect, the game input data simulating the actual swing operation can be calculated based on a relationship among the cycle of the function, the time interval between extremums, and an elapsed time from an extremum.

According to the fifth aspect, the game input data simulating the actual swing operation can be calculated based on a relationship among the cycle of the function, the time interval between a maximum value and a minimum value, and an elapsed time from a most recent extremum.

According to the sixth aspect, the game input data simulating the actual swing operation can be calculated by inverting the sign of the game input data, depending on the type (a maximum value or a minimum value) of the most recent extremum.

According to the seventh and eighth aspects, the game input data can be calculated by setting the cycle of a sine function to be a cycle of an actual swing operation.

According to the ninth and tenth aspects, the game input data can be calculated by setting the cycle of a cosine function to be a cycle of an actual swing operation.

According to the eleventh aspect, the game input data simulating the actual swing operation can be calculated, depending on an acceleration occurring in the input device.

According to the twelfth and thirteenth aspects, in a game in which the player performs an operation of reciprocatingly tilting the input device, the game input data simulating an operation of actually swinging the input device can be calculated.

According to the fourteenth aspect, when the player does not reciprocatingly tilt the input device, game input data simulating a static angle of the input device can be calculated.

According to the fifteenth aspect, in a game in which the player performs an operation of swinging the input device in a vertical direction in a real space, the game input data simulating an operation of actually swinging the input device can be calculated.

According to the sixteenth aspect, when the player has ended an operation of reciprocatingly tilting the input device, the game input data simulating the static angle of the input device can be calculated.

According to the seventeenth aspect, the cyclicality of values indicated by the output data can be appropriately simulated using a sine function or a cosine function, which are typical cyclic functions.

According to the eighteenth aspect, the game input data simulating an operation of the player actually swinging the input device, depending on the strength of a motion applied to the input device by the player, is obtained. Therefore, a game process is executed, depending on a motion intended by the player, and the enjoyment of a game can be improved by a process which is executed in synchronization with the strength of a swing motion of the player.

According to the nineteenth aspect, the output data can be used to determine whether or not the player has ended an operation of swinging the input device.

According to the twenty-first aspect, the output data can be used to determine whether or not the player is not swinging the input device.

According to the twentieth or twenty-second aspect, when the player has ended swinging of the input device or when the player is not swinging the input device, game input data can be obtained, depending on a static attitude of the input device. Therefore, a game process is executed, depending on an operation intended by the player, and the enjoyment of a game can be improved by a process which is executed in synchronization with an operation of the player statically changing the attitude of the input device.

According to the twenty-third aspect, a game image in which a tilt of the input device itself is appropriately reflected on a tilt of an object, can be displayed.

According to the twenty-fourth aspect, it is possible to achieve a game in which an object is moved, depending on an operation of swinging the input device, and another object is affected by a predetermined influence, depending on the movement.

According to the game apparatus of the example embodiment presented herein, an effect similar to that of the storage medium storing the game program can be obtained.

These and other features, aspects and advantages of the example embodiment will become more apparent from the following detailed description of the example embodiment when taken in conjunction with the accompanying drawings.

BRIEF DESCRIPTION OF THE DRAWINGS

FIG. 7 is a block diagram illustrating a configuration of the controller 7 of FIG. 3;

DESCRIPTION OF THE PREFERRED EMBODIMENTS

Figure 1:
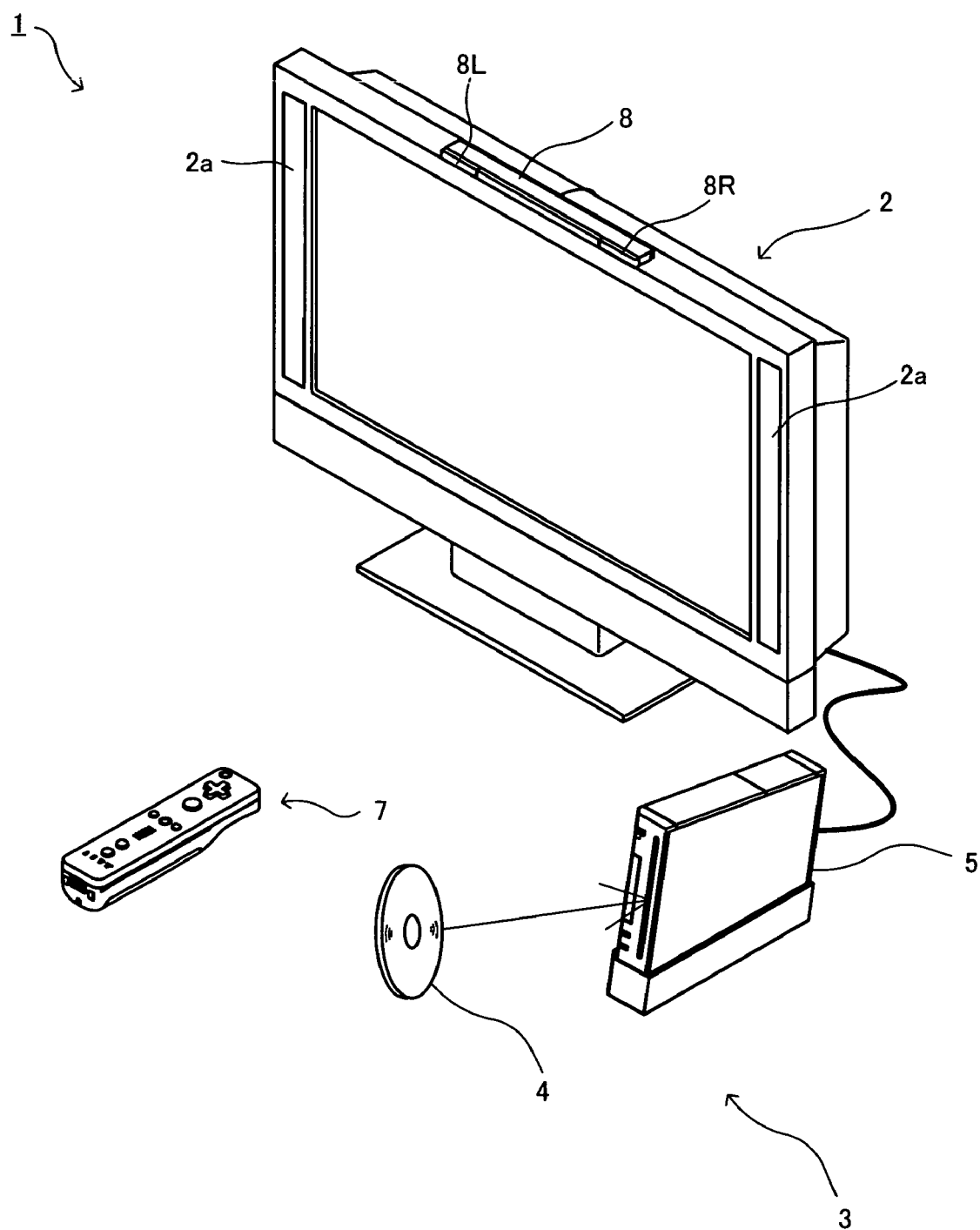
FIG. 1 is an external view of a game system 1 according to an embodiment.
Figure 2:
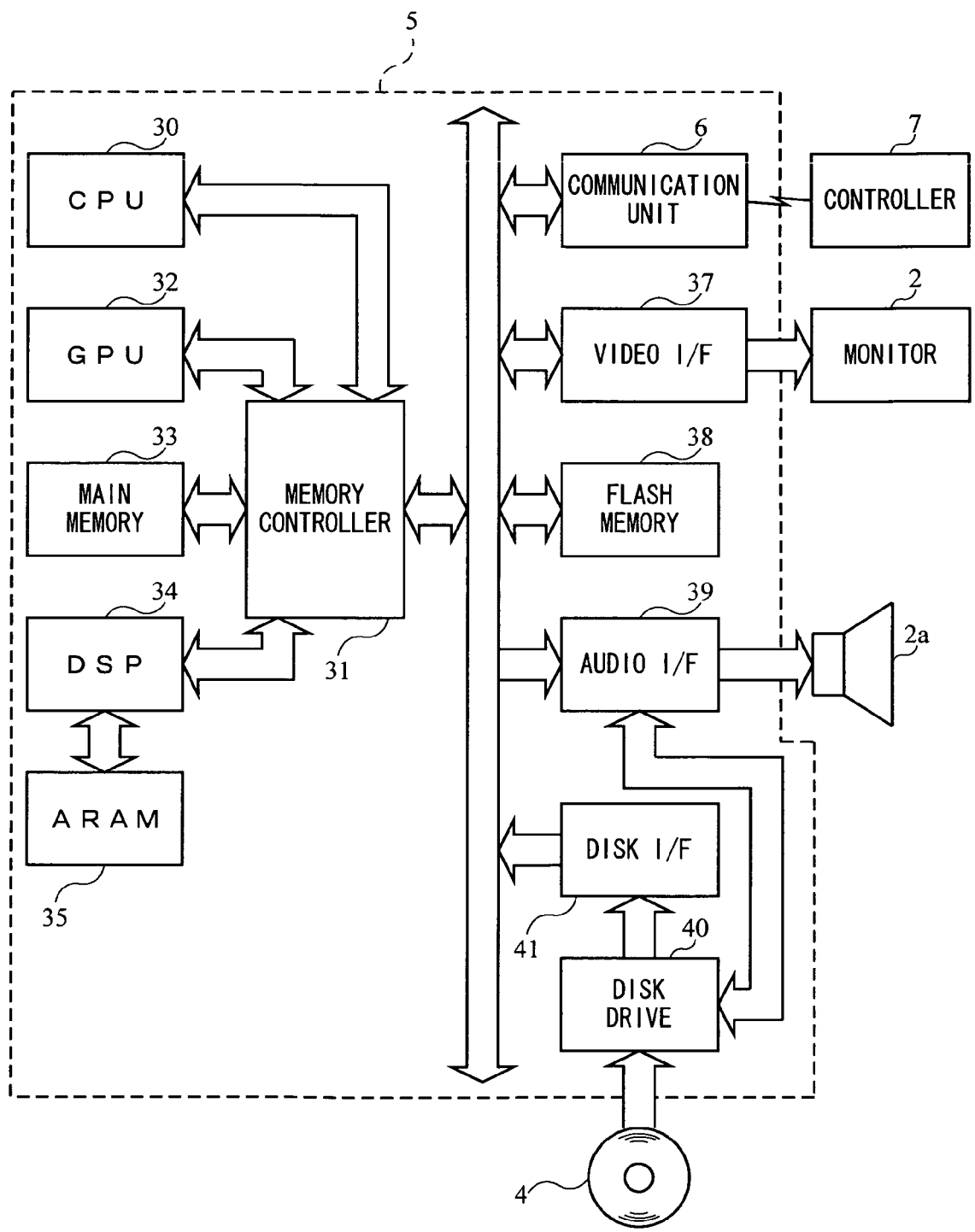
FIG. 2 is a functional block diagram of a main body 5 of a game apparatus of FIG. 1.

A game apparatus according to an embodiment will be described with reference to FIG. 1. Hereinafter, in order to specifically describe the example embodiment, a game system including a stationary game apparatus as an example of the game apparatus will be described. Note that FIG. 1 is an external view of a game system 1 including a stationary game apparatus 3, and FIG. 2 is a block diagram of a main body 5 of the game apparatus. Hereinafter, the game system 1 will be described.

In FIG. 1, the game system 1 is composed of a television set for home use (hereinafter referred to as a monitor) 2 as an exemplary display means, and the stationary game apparatus 3 connected to the monitor 2 via a connection cord. The monitor 2 comprises a loudspeaker 2a for outputting sound based on an audio signal output from the game apparatus main body 5. The game apparatus 3 comprises an optical disc 4 which stores a game program as an exemplary information processing program of the present invention, the game apparatus main body 5 including a computer for executing the game program of the optical disc 4 and outputting and displaying a game screen on the monitor 2, and a controller 7 for inputting, to the game apparatus main body 5, operational information required for a game in which a character or the like displayed on the game screen is operated.

The game apparatus main body 5 includes a communication unit 6. The communication unit 6 receives data which is wirelessly transmitted from the controller 7, and transmits data from the game apparatus main body 5 to the controller 7, i.e., connects the controller 7 and the game apparatus main body 5 via wireless communication. The optical disc 4 which is an exemplary information storing medium changeable with respect to the game apparatus main body 5 is detachably attached to the game apparatus main body 5. On a front major surface of the game apparatus main body 5, a power ON/OFF switch for the game apparatus main body 5, a game process reset switch, a slot through which the optical disc 4 is detached or attached, an eject switch for removing the optical disc 4 through the slot of the game apparatus main body 5, and the like are provided.

A flash memory 38 which functions as a backup memory for fixedly storing saved data or the like is provided in the game apparatus main body 5. The game apparatus main body 5 executes a game program or the like stored on the optical disc 4, and displays a result of the execution as a game image on the monitor 2. The game apparatus main body 5 can also reproduce a game state which was executed in the past, using the saved data stored in the flash memory 38, and display a game image on the monitor 2. The player of the game apparatus main body 5 can enjoy events of the game by operating the controller 7 while watching the game image displayed on the monitor 2.

The controller 7 wirelessly transmits transmission data, such as operational information or the like, to the game apparatus main body 5 including the communication unit 6 using, for example, the Bluetooth® technique. The controller 7 is an operation means for mainly operating a player character or the like appearing in a game space displayed on the display screen of the monitor 2. The controller 7 is provided with a housing having a size which allows the player to hold the controller 7 with one hand, and a plurality of operation buttons (including a cross key, a stick, and the like) provided and exposed on a surface of the housing. The controller 7 also comprises an image capture information computing section 74 for capturing an image viewed from the controller 7 as specifically described below. As exemplary objects whose images to be captured by the image capture information computing section 74, two LED modules (hereinafter referred to as markers) 8L and 8R are provided in the vicinity of the display screen of the monitor 2. The markers 8L and 8R each emit infrared light toward the front of the monitor 2. The controller 7 can also receive transmission data wirelessly transmitted from the communication unit 6 of the game apparatus main body 5 using a communication section 75, and generate sound or vibration depending on the transmission data.

In FIG. 2, the game apparatus main body 5 comprises, for example, a CPU (Central Processing Unit) 30 which executes various programs. The CPU 30 executes a boot program stored in a boot ROM (not shown) and performs, for example, initialization of memories, such as a main memory 33 and the like, before executing a game program stored in the optical disc 4, and performs a game process or the like corresponding to the game program. A GPU (Graphics Processing Unit) 32, the main memory 33, a DSP (Digital Signal Processor) 34, an ARAM (Audio RAM) 35, and the like are connected via a memory controller 31 to the CPU 30. The communication unit 6, a video I/F (interface) 37, the flash memory 38, an audio I/F 39, and a disk I/F 41 are connected via a predetermined bus to the memory controller 31. The monitor 2, the loudspeaker 2a, and a disk drive 40 are connected to the video I/F (interface) 37, the audio I/F 39, and the disk I/F 41, respectively.

The GPU 32 performs image processing based on a command from the CPU 30, and is composed of, for example, a semiconductor chip which performs a calculation process required for 3D graphics display. The GPU 32 performs image processing using a memory specialized for image processing (not shown) or a memory area which is a portion of the main memory 33. The GPU 32 uses these to generate game image data or movie video to be displayed on the monitor 2, and outputs the data via the memory controller 31 and the video I/F 37 to the monitor 2 as appropriate.

The main memory 33 is a memory area used in the CPU 30, and stores a game program or the like required for a process by the CPU 30 as appropriate. For example, the main memory 33 stores a game program, various data, or the like read from the optical disc 4 by the CPU 30. The game program, the various data, or the like stored in the main memory 33 are executed by the CPU 30.

The DSP 34 processes sound data or the like which is generated in the CPU 30 when a game program is executed. The ARAM 35 for storing the sound data or the like is connected to the DSP 34. The ARAM 35 is used when the DSP 34 performs a predetermined process (e.g., storage of a read-ahead game program or sound data). The DSP 34 reads sound data stored in the ARAM 35, and outputs the data via the memory controller 31 and the audio I/F 39 to the loudspeaker 2a included in the monitor 2.

The memory controller 31 performs a centralized control of data transfer. The above-described various I/Fs are connected to the memory controller 31. As described above, the communication unit 6 receives transmission data from the controller 7, and outputs the transmission data to the CPU 30. The communication unit 6 also transmits transmission data output from the CPU 30 to the communication section 75 of the controller 7. The monitor 2 is connected to the video I/F 37. The loudspeaker 2a included in the monitor 2 is connected to the audio I/F 39 so that sound data read from the ARAM 35 by the DSP 34 or sound data directly output from the disc drive 40 can be output from the loudspeaker 2a. The disc drive 40 is connected to the disc I/F 41. The disc drive 40 reads data stored at a predetermined read-out position on the optical disc 4, and outputs the data to the bus and the audio I/F 39 of the game apparatus main body 5.

Figure 3:
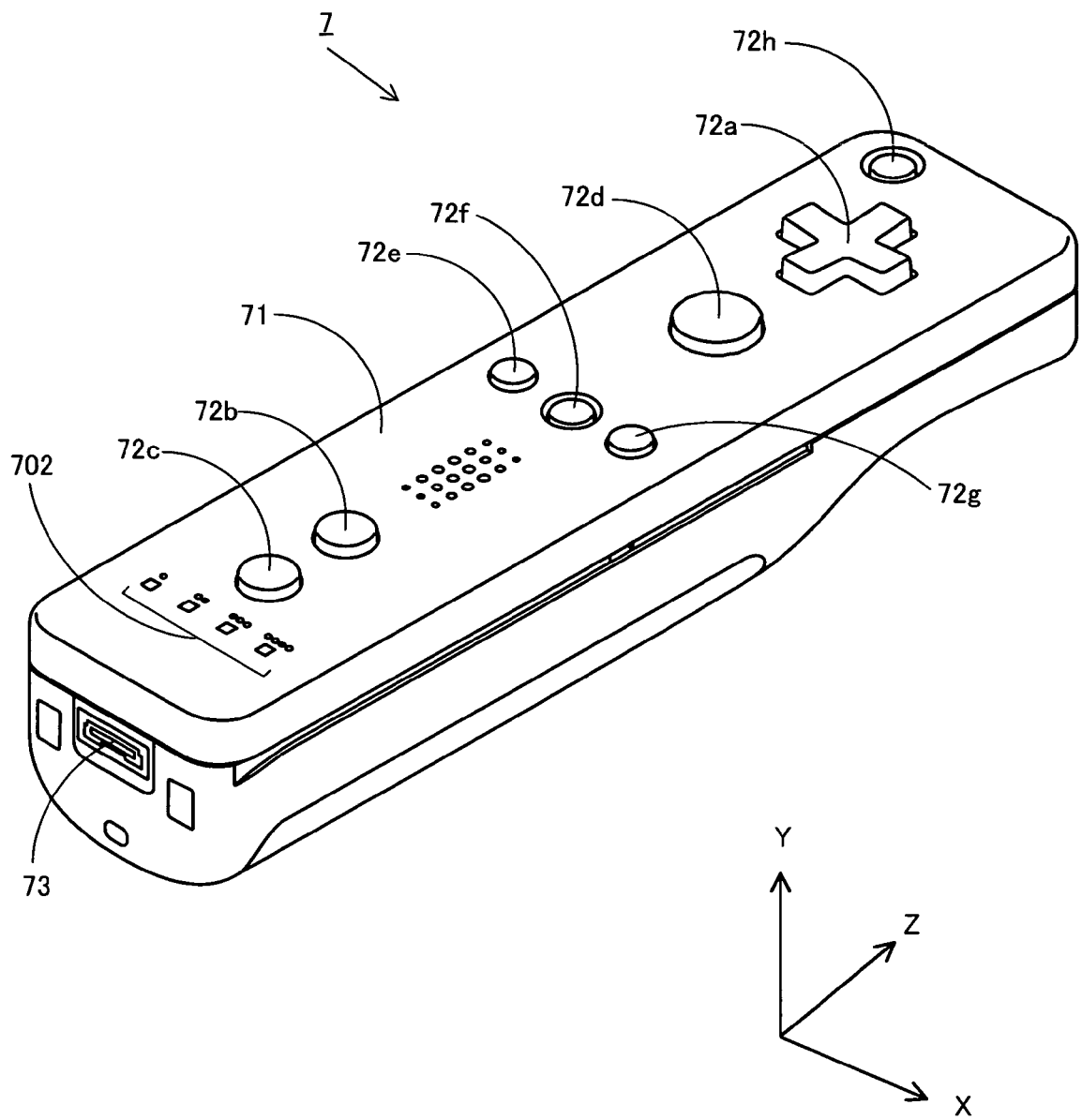
FIG. 3 is a perspective view of a controller 7 as viewed from the top and the rear.
Figure 4:
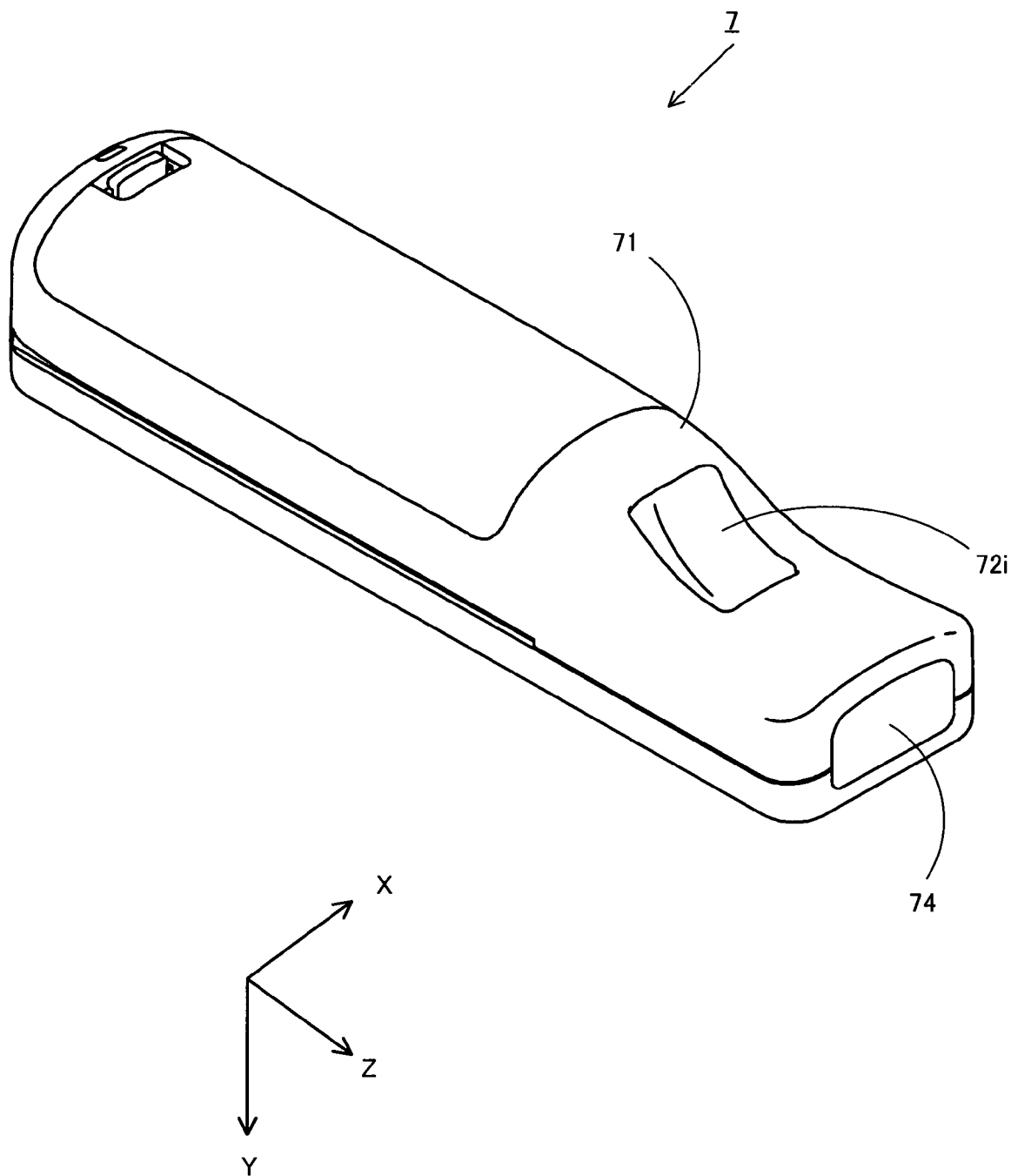
FIG. 4 is a perspective view of the controller 7 of FIG. 3 as viewed from the bottom and the front.

The controller 7 will be described with reference to FIGS. 3 and 4. Note that FIG. 3 is a perspective view of the controller 7 as viewed from the top and the rear. FIG. 4 is a perspective view of the controller 7 as viewed from the bottom and the front.

In FIGS. 3 and 4, the controller 7 has a housing 71 formed by, for example, plastic molding. The housing 71 is provided with a plurality of operation sections 72. The housing 71 is in the shape of substantially a rectangular parallelepiped where a front-to-rear direction is a longitudinal direction. The whole housing 71 has a size which allows an adult and a child to hold the controller 7 with one hand.

A cross key 72a is provided on a central portion closer to a front surface of an upper surface of the housing 71. The cross key 72a is a four-direction push switch in the shape of a cross, and has operation portions corresponding to the respective four directions (frontward, rearward, leftward, and rightward), the operation portions being provided at the respective projecting pieces of the cross which are arranged at intervals of 90°. Any of the frontward, rearward, leftward and rightward directions is selected by a player pushing down any of the operation portions of the cross key 72a. For example, by a player operating the cross key 72a, a movement direction of a player character or the like appearing in a virtual game world can be designated, or one can be selected and designated from a plurality of options.

Note that the cross key 72a is an operation section which outputs an operation signal, depending on the above-described direction input operation by a player, or may be an operation section of other embodiments. For example, an operation section may be provided in which four push switches are disposed in cross directions, and an operation signal is output, depending on a push switch pushed down by a player. In addition to the four push switches, a center switch may be provided at an intersection position of the cross directions, i.e., a complex operation section composed of the four push switches and the center switch may be provided. Also, instead of the cross key 72a, an operation section may be provided which outputs an operation signal, depending on a tilt direction of a tiltable stick (so-called joystick) which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a.

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of a 1st button, a 2nd button, an A button, and the like are assigned to the operation buttons 72b to 72d. Functions of a minus switch, a home switch, a plus button, and the like are assigned to the operation buttons 72e to 72g. The operation buttons 72a to 72g are assigned the respective functions, depending on a game program executed by the game apparatus main body 5. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that a player is prevented from unintentionally and erroneously pushing down the button.

Also, an operation button 72h is provided at the front of the cross key 72a on the upper surface of the housing 71. The operation button 72h is a power supply switch which remotely switches ON/OFF a power supply for the game apparatus main body 5. The operation button 72h is also a button of the type whose upper surface is buried below the upper surface of the housing 71 so that a player is prevented from unintentionally and erroneously pushing down the button.

A plurality of LEDs 702 are provided at the rear of the operation button 72c of the upper surface of the housing 71. Here, the controller 7 is assigned controller identification (number) so as to distinguish it from other controllers 7. For example, the LEDs 702 are used so as to inform the player of controller identification currently set for the controller 7. Specifically, when transmission data is transmitted from the controller 7 to the communication unit 6, one of the LEDs 702 is turned ON, depending on the controller identification.

Also, sound holes through which sound is emitted from a loudspeaker (a loudspeaker 706 of FIG. 5) described below to the outside are formed between the operation button 72b and the operation buttons 72e to 72g on the upper surface of the housing 71.

On the other hand, a hollow portion is formed on a lower surface of the housing 71. The hollow portion on the lower surface of the housing 71 is formed at a position where the index finger or the middle finger of a player is placed when the player holds the controller 7 with one hand while directing a front surface of the controller 7 toward the markers 8L and 8R. An operation button 72i is provided on a rear slope surface of the hollow portion. The operation button 72i is an operation section which functions as, for example, a B button.

An image capturing element 743 which is a part of the image capture information computing section 74 is provided on a front surface of the housing 71. Here, the image capture information computing section 74 is a system for analyzing image data captured by the controller 7 to determine a place having a high luminance in the image data and detecting a center-of-gravity position or a size of the place. The image capture information computing section 74 has, for example, a maximum sampling cycle of about 200 frames/sec, and therefore, can track and analyze relatively high-speed movement of the controller 7. A detailed structure of the image capture information computing section 74 will be described below. A connector 73 is provided on a rear surface of the housing 71. The connector 73 is, for example, an edge connector which is utilized so as to be engaged and connected with a connection cable.

Here, in order to specifically describe the example embodiment presented herein, a coordinate system which is set with respect to the controller 7 is defined. As illustrated in FIGS. 3 and 4, X, Y and Z axes, which are orthogonal to each other, are defined with respect to the controller 7. Specifically, a front-to-rear direction of the controller 7 (a longitudinal direction of the housing 71) is assumed to be the Z axis, and a front surface (a surface on which the image capture information computing section 74 is provided) direction of the controller 7 is assumed to be the positive direction of the Z axis. A vertical direction of the controller 7 is assumed to be the Y axis, and an upper surface (a surface on which the operation button 72a is provided) direction of the housing 71 is assumed to be the positive direction of the Y axis. A lateral direction of the controller 7 is assumed to be the X axis, and a left side surface (a side surface illustrated in FIG. 3) direction of the housing 71 is assumed to be the positive direction of the X axis.

Figure 5:
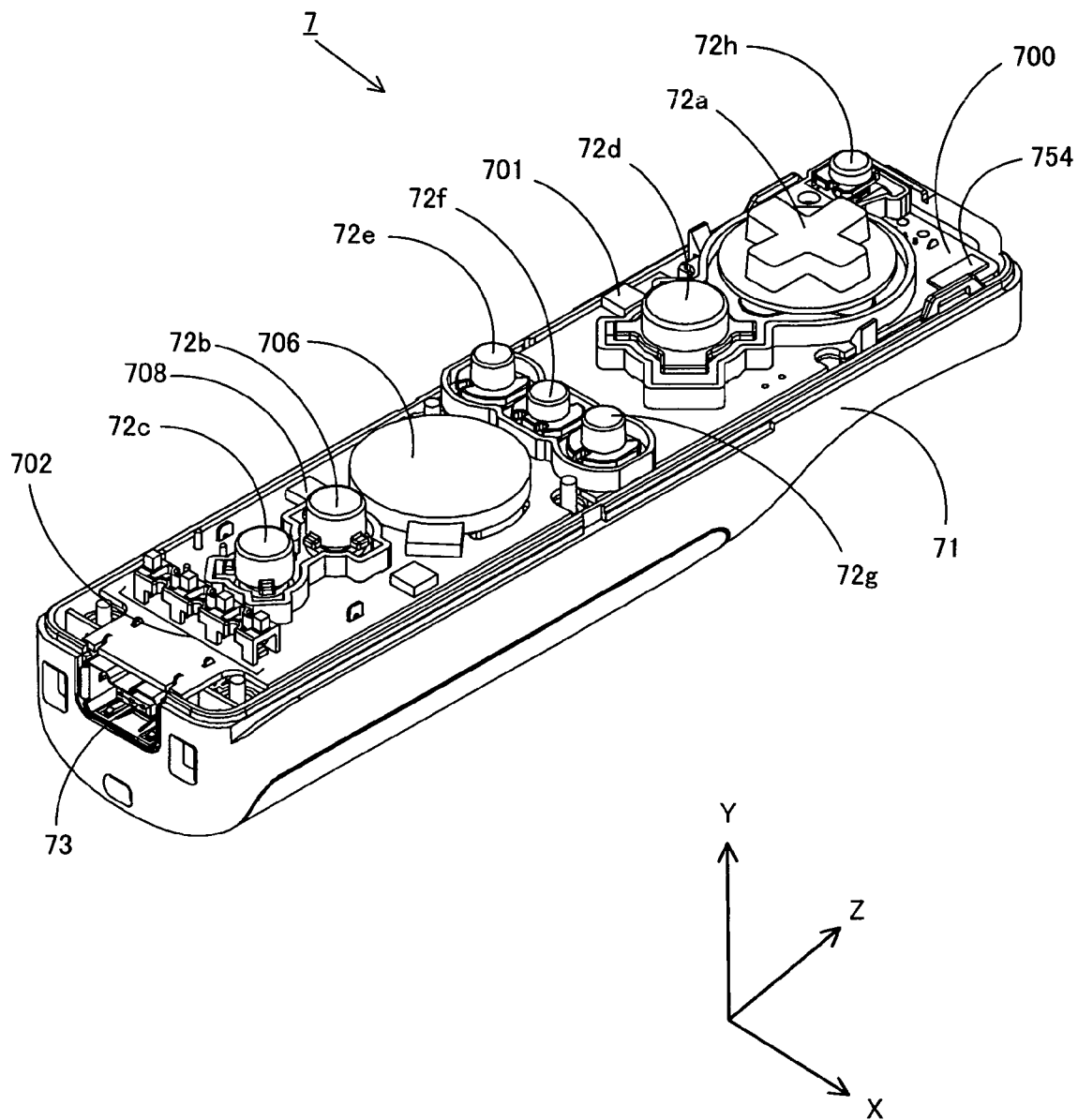
FIG. 5 is a perspective view of the controller 7 of FIG. 3 where an upper housing is cut away.
Figure 6:
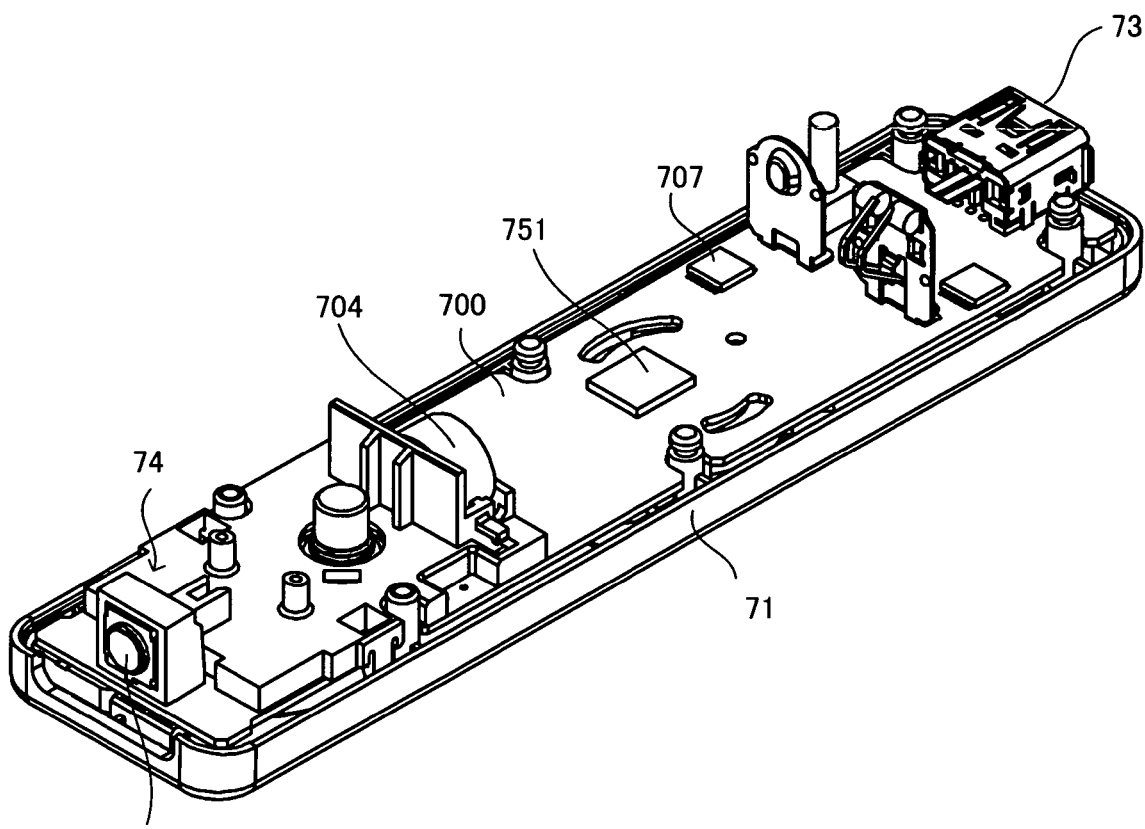
FIG. 6 is a perspective view of the controller 7 of FIG. 4 where a lower housing is cut away.

Next, an internal structure of the controller 7 will be described with reference to FIGS. 5 and 6. Note that FIG. 5 is a perspective view of the controller 7 (as viewed from a rear surface side thereof) where an upper housing (a portion of the housing 71) is cut away. FIG. 6 is a perspective view of the controller 7 (as viewed from a front surface side thereof) where a lower housing (a portion of the housing 71) is cut away. FIG. 6 illustrates a perspective view of a base board 700 of FIG. 5 as viewed from a bottom surface thereof.

In FIG. 5, the base board 700 is fixed inside the housing 71. On an upper major surface of the base board 700, the operation buttons 72a to 72h, an acceleration sensor 701, the LEDs 702, an antenna 754, and the like are provided. These are connected to a microcomputer 751 (see FIGS. 6 and 7) via a conductor (not shown) formed on the base board 700 and the like. Also, by a radio module 753 (see FIG. 7) and an antenna 754, the controller 7 functions as a wireless controller. Note that a quartz oscillator (not shown) is provided in the housing 71, and generates a basic clock for the microcomputer 751 (described below). Also, the loudspeaker 706 and an amplifier 708 are provided on the upper major surface of the base board 700. Also, the acceleration sensor 701 is provided on a left side of the operation button 72d on the base board 700 (i.e., a peripheral portion of the base board 700, but not a center portion thereof). Therefore, the acceleration sensor 701 can detect an acceleration including a component due to a centrifugal force as well as a change in direction of a gravitational acceleration, depending on a rotation of the controller 7 around the longitudinal direction as an axis. Therefore, by predetermined computation, the rotation of the controller 7 can be determined based on the detected acceleration data with satisfactory sensitivity by the game apparatus main body 5 or the like.

On the other hand, in FIG. 6, the image capture information computing section 74 is provided at a front edge on a lower major surface of the base board 700. The image capture information computing section 74 is composed of an infrared filter 741, a lens 742, an image capturing element 743, and an image processing circuit 744, which are arranged in this order from the front of the controller 7, and are attached on the lower major surface of the base board 700. A connector 73 is attached to a rear edge on the lower major surface of the base board 700. Also, a sound IC 707 and the microcomputer 751 are provided on the lower major surface of the base board 700. The sound IC 707 is connected to the microcomputer 751 and the amplifier 708 via conductors formed on the base board 700 and the like, and outputs an audio signal via the amplifier 708 to the loudspeaker 706, depending on sound data transmitted from the game apparatus main body 5.

A vibrator 704 is attached onto the lower major surface of the base board 700. The vibrator 704 may be, for example, a vibration motor or a solenoid. The vibrator 704 is connected to the microcomputer 751 via a conductor formed on the base board 700 and the like, and its activation is switched ON/OFF, depending on vibration data transmitted from the game apparatus main body 5. The activation of the vibrator 704 generates vibration in the controller 7, so that the vibration is transferred to a player's hand holding the controller 7, thereby making it possible to achieve a so-called vibration-feature supporting game. Here, since the vibrator 704 is disposed somehow closer to the front of the housing 71, the housing 71 significantly vibrates while the player is holding the controller 7, so that the player easily feels vibration.

Next, an internal configuration of the controller 7 will be described with reference to FIG. 7. Note that FIG. 7 is a block diagram illustrating the configuration of the controller 7.

In FIG. 7, the controller 7 comprises the communication section 75 in addition to the operation section 72, the image capture information computing section 74, the acceleration sensor 701, the vibrator 704, the loudspeaker 706, the sound IC 707, and the amplifier 708.

The image capture information computing section 74 includes the infrared filter 741, the lens 742, the image capturing element 743, and the image processing circuit 744. The infrared filter 741 passes only infrared light entering from the front of the controller 7. The lens 742 collects infrared light passing through the infrared filter 741 and causes the light to enter the image capturing element 743. The image capturing element 743 may be, for example, a solid-state image capturing element, such as a CMOS sensor or a CCD, and captures infrared light collected by the lens 742. Therefore, the image capturing element 743 captures only infrared light passing through the infrared filter 741 to generate image data. The image data generated by the image capturing element 743 is processed by the image processing circuit 744. Specifically, the image processing circuit 744 processes the image data obtained from the image capturing element 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself.

The controller 7 preferably comprises the acceleration sensor 701 which senses accelerations along with three axes (X, Y and Z axes). The three-axis acceleration sensor 701 senses linear accelerations in three directions, i.e., a vertical direction (the Y axis of FIG. 3), a lateral direction (the X axis of FIG. 3), and a front-to-rear direction (the Z axis of FIG. 3). In other embodiments, the acceleration sensor 701 may be an acceleration detecting means which senses a linear acceleration along at least one axis, depending on the type of a control signal used in a game process. For example, the acceleration sensors 701 may be of a type which is available from Analog Devices, Inc. or STMicroelectronics N.V. The acceleration sensor 701 is preferably of a capacitance type (capacitance coupling type) based on a technique of MEMS (Micro Electro Mechanical Systems) obtained by micromachining silicon. However, any of one- to three-axis acceleration sensors 701 may be provided using a technique of existing acceleration detecting means (e.g., a piezoelectric type or a piezoelectric resistance type) or other appropriate techniques which will be developed in the future.

An acceleration detecting means used as the acceleration sensor 701 can sense only an acceleration (linear acceleration) along a straight line corresponding to each axis of the acceleration sensor 701. In other words, a direct output from the acceleration sensor 701 is a signal indicating a linear acceleration (static or dynamic) along each of the three axes. Therefore, the acceleration sensor 701 cannot directly sense physical properties, such as a motion along a non-linear path (e.g., an arc, etc.), a rotation, a rotational motion, an angular displacement, a tilt, a position, an attitude, and the like.

However, it would be easily understood by those skilled in the art from the description of the present specification that further information about the controller 7 can be estimated or calculated (determined) by performing an additional process with respect to an acceleration signal output from the acceleration sensor 701. For example, when a static acceleration (gravitational acceleration) is sensed, an output from the acceleration sensor 701 is used to perform a computation using a tilt angle and the sensed acceleration, thereby making it possible to determine a tilt of a subject (the controller 7) with respect to a gravity vector. Thus, by using the acceleration sensor 701 in combination with the microcomputer 751 (or other processors, such as the CPU 30 included in the game apparatus main body 5, and the like), the tilt, attitude or position of the controller 7 can be determined. Similarly, for example, when the controller 7 comprising the acceleration sensor 701 is dynamically accelerated and moved by a player's hand, various motions and/or positions of the controller 7 can be calculated by processing an acceleration signal generated by the acceleration sensor 701. In other examples, the acceleration sensor 701 may comprise an incorporation-type signal processing device or other types of dedicated processing devices for performing a desired process with respect to an acceleration signal output from a built-in acceleration detecting means before outputting a signal to the microcomputer 751. For example, the incorporation-type or dedicated processing device, when used for detection of a static acceleration (e.g., a gravitational acceleration) by the acceleration sensor 701, may be for converting a sensed acceleration signal into a tilt angle corresponding thereto (or other preferable parameters). Data indicating the accelerations sensed by the acceleration sensor 701 is output to the communication section 75.

In other embodiments, as an acceleration sensor for detecting a motion of the controller 7, a gyro-sensor comprising a rotation element, a vibration element, or the like may be employed. An exemplary MEMS gyro-sensor used in this embodiment is available from Analog Devices, Inc. As is different from the acceleration sensor 701, the gyro-sensor can directly sense a rotation (or an angular velocity) about an axis of at least one gyro-element included therein. Thus, since the gyro-sensor and the acceleration sensor are basically different from each other, one of them is selected, depending on the individual application, and processes performed for output signals from these devices need to be changed as appropriate.

Specifically, when a tilt or an attitude is calculated using a gyro-sensor instead of an acceleration sensor, a significant change is required. Specifically, when a gyro-sensor is used, the value of a tilt is initialized during the start of detection. Thereafter, angular acceleration data output from the gyro-sensor is integrated. Next, the amount of a change in tilt is calculated from the initialized tilt value. In this case, the calculated tilt has a value corresponding to an angle. On the other hand, when an acceleration sensor is used to calculate a tilt, the tilt is calculated by comparing the value of a component about each axis of a gravitational acceleration with a predetermined reference. Therefore, the calculated tilt can be represented by a vector, and an absolute direction can be detected by the acceleration detecting means without initialization. Also, whereas a value calculated as a tilt is an angle when a gyro-sensor is used, the value is a vector when an acceleration sensor is used. Therefore, when a gyro-sensor is used instead of an acceleration sensor, the tilt data needs to be subjected to predetermined conversion, taking into consideration a difference between the two devices. The properties of gyro-sensors as well as the basic difference between the acceleration detecting means and the gyro-sensor are know to those skilled in the art, and will not be herein described in more detail. Whereas gyro-sensors have an advantage of directly sensing rotation, acceleration sensors generally have an advantage over the gyro-sensor in terms of cost effectiveness when the acceleration sensor is applied to a controller as used in this embodiment.

The communication section 75 comprises the microcomputer 751, the memory 752, the radio module 753, and the antenna 754. The microcomputer 751 controls the radio module 753 for wirelessly transmitting transmission data while using the memory 752 as a memory area during a process. Also, the microcomputer 751 controls operations of the sound IC 707 and the vibrator 704, depending on data from the game apparatus main body 3 which is received by the radio module 753 via the antenna 754. The sound IC 707 processes sound data or the like transmitted from the game apparatus main body 3 via the communication section 75. Also, the microcomputer 751 activates the vibrator 704, depending on vibration data (e.g., a signal for switching ON/OFF the vibrator 704) or the like transmitted from the game apparatus main body 3 via the communication section 75.

An operation signal (key data) from the operation section 72 provided in the controller 7, acceleration signals in the three axial directions (X-, Y- and Z-axis direction acceleration data) from the acceleration sensor 701, and process result data from the image capture information computing section 74, are output to the microcomputer 751. The microcomputer 751 temporarily stores the received data (the key data, the X-, Y- and Z-axis direction acceleration data, and the process result data), as transmission data to be transmitted to the communication unit 6, into the memory 752. Here, radio transmission from the communication section 75 to the communication unit 6 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth® is 5 ms. When timing of transmission to the communication unit 6 arrives, the microcomputer 751 outputs transmission data stored in the memory 752, as a series of pieces of operational information, to the radio module 753. Thereafter, the radio module 753 emits the operational information, as a radio signal, from the antenna 754 using a carrier wave having a predetermined frequency by means of, for example, the Bluetooth® technique. Specifically, the key data from the operation section 72 provided in the controller 7, the X-, Y- and Z-axis direction acceleration data from the acceleration sensor 701, and the process result data from the image capture information computing section 74 are transmitted from the controller 7. Thereafter, the communication unit 6 of the game apparatus main body 5 receives the radio signal, and the game apparatus main body 5 demodulates or decodes the radio signal, thereby obtaining a series of pieces of operational information (the key data, the X-, Y- and Z-axis direction acceleration data, and the process result data). Thereafter, the CPU 30 of the game apparatus main body 5 performs a game process based on the obtained operational information and a game program. Note that, when the communication section 75 is configured using the Bluetooth® technique, the communication section 75 can also have a function of receiving transmission data wirelessly transmitted from other devices.

Figure 8:
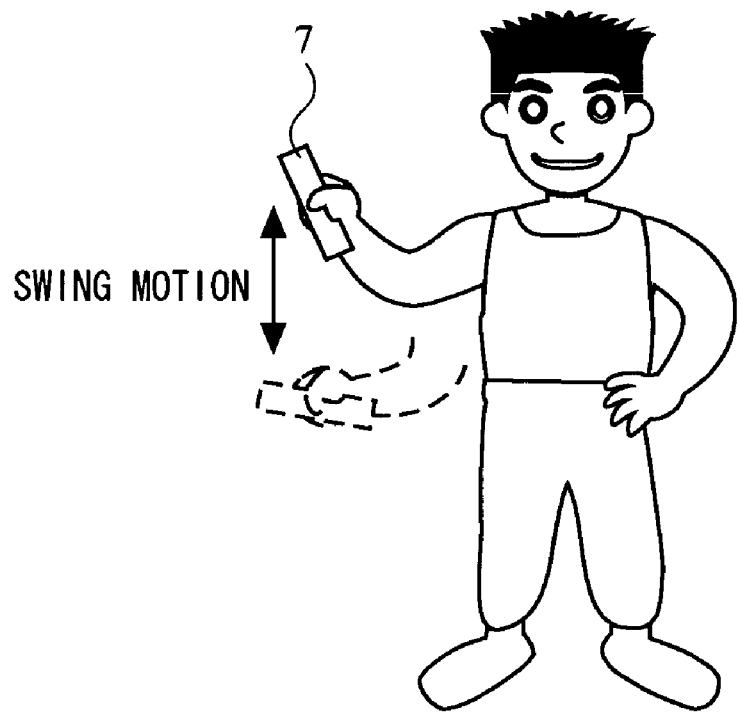
FIG. 8 is a diagram illustrating an outline of a situation where a game operation is performed using the controller 7 of FIG. 3.
Figure 8:
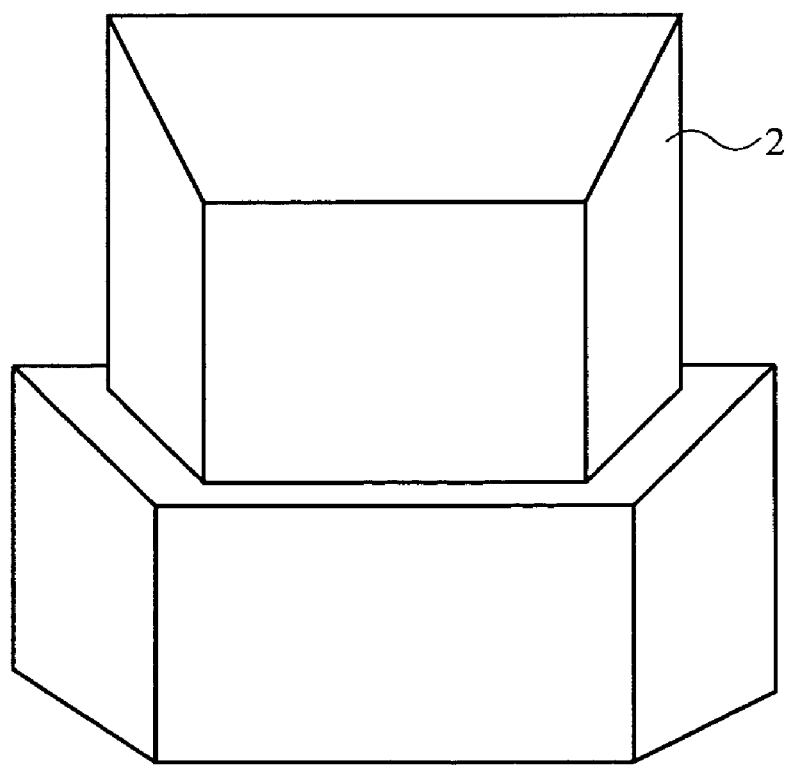

Next, before describing a specific operation performed by the game apparatus main body 5, an outline of a game performed by the game apparatus main body 5 will be described. As illustrated in FIG. 8, the controller 7 has a whole size which allows an adult and a child to hold with one hand. In order to play a game using the controller 7 in the game system 1, a player holds the controller 7 with one hand, and swings the controller 7 vertically. An object displayed on the monitor 2 is swung, depending on such a motion of the player swinging the controller 7.

Figure 9:
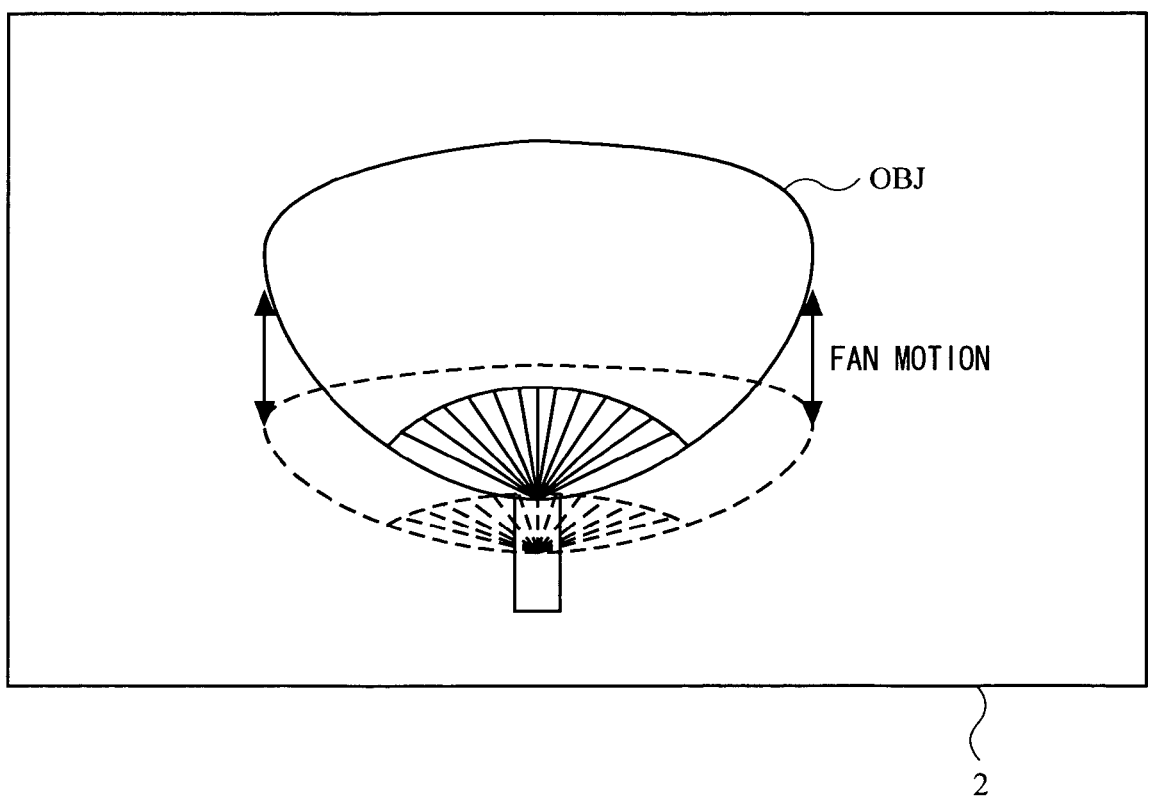
FIG. 9 is a diagram illustrating an exemplary object OBJ displayed on a monitor 2.

For example, as illustrated FIG. 9, an object OBJ mimicking a fan is displayed on the monitor 2. A motion of fanning the object OBJ is expressed in a virtual game world, depending on a motion of the controller 7 being swung vertically by the player. In this case, if the player swings the controller 7 vertically in predetermined cycles, a motion of the object OBJ being swung vertically in the same cycles is expressed. Also, if the player swings the controller 7 vertically over a large vertical length, a motion of the object OBJ being swung vertically over a large vertical length is expressed. Also, if the player statically tilts the main body of the controller 7, the object OBJ tilted at a similar tilt angle is expressed in the virtual game space. In other words, the motion of the object OBJ is expressed in synchronization with the motion of the player swinging the controller 7 itself, the player feels a sense of game as if the player fanned the object OBJ in the virtual game space.

For example, when the player statically tilts the controller 7 vertically, operational information is input from the controller 7 (specifically, X-, Y- and Z-axis direction acceleration data) to the game apparatus main body 5. When the player swings the controller 7 vertically, operational information corresponding to the centrifugal force or the like is input from the controller 7 to the game apparatus main body 5. Since such a variation in acceleration applied to the controller 7 can be detected by the acceleration sensor 701, a tilt or a motion of the controller 7 can be calculated by executing an additional process with respect to the X-, Y- and Z-axis direction acceleration data output from the acceleration sensor 701. In general, when an acceleration which is generated depending on an operation is detected, an acceleration vector (or the sign of an acceleration) output from the acceleration sensor 701 has a direction exactly opposite to the acceleration direction of the controller 7. Therefore, the direction of the detected acceleration needs to be taken into consideration when the tilt or motion of the controller 7 is calculated.

Next, a game process executed in the game system 1 will be described in detail. Firstly, main data used in the game process will be described with reference to FIG. 10. Note that FIG. 10 is a diagram illustrating main data stored in the main memory 33 of the game apparatus main body 5.

Figure 10:
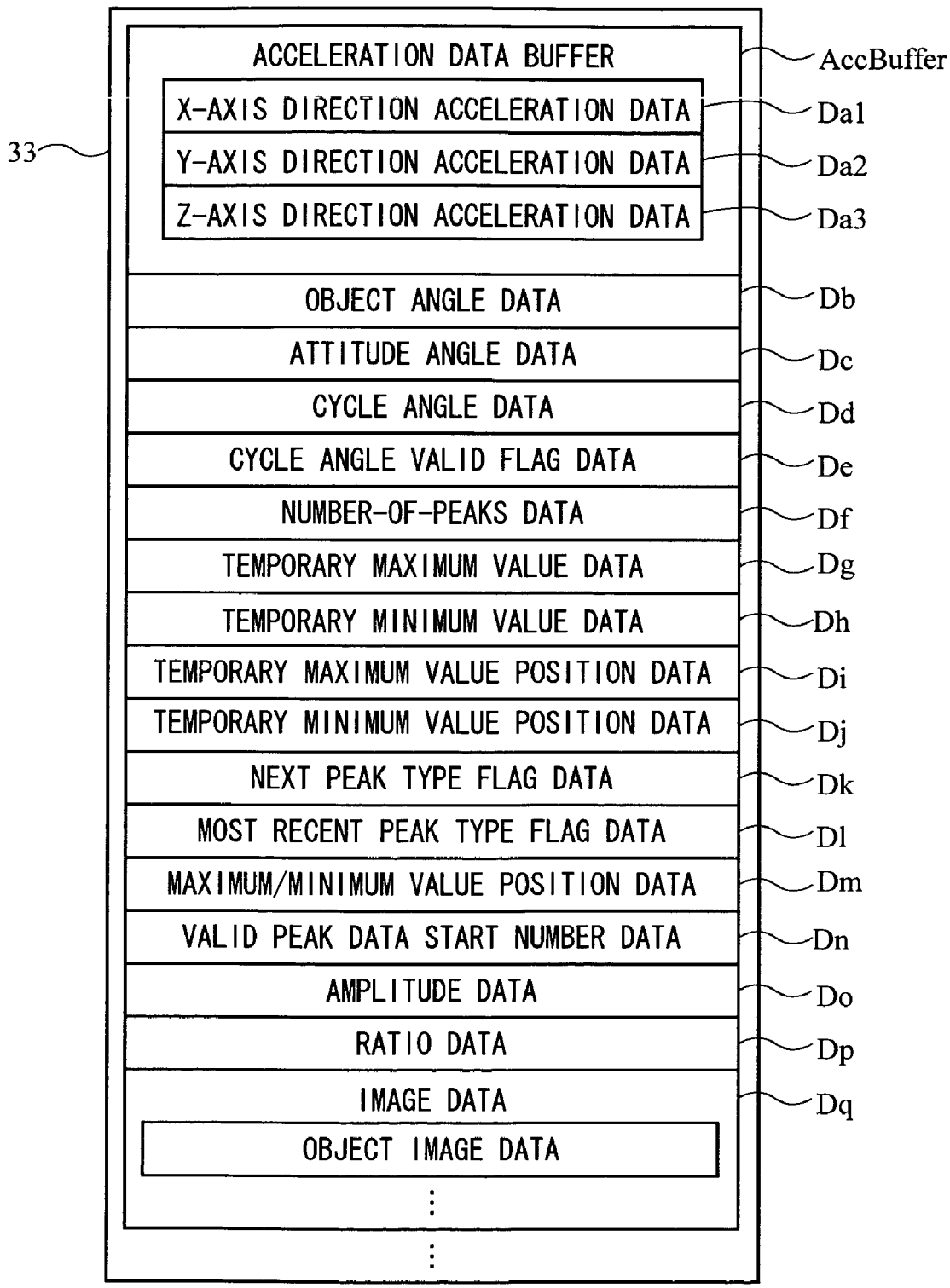
FIG. 10 is a diagram illustrating main data stored in a main memory 33 of the game apparatus main body 5.

As illustrated in FIG. 10, the main memory 33 is provided with an acceleration data buffer AccBuffer. The main memory 33 also stores object angle data Db, attitude angle data Dc, cycle angle data Dd, cycle angle valid flag data De, number-of-peaks data Df, temporary maximum value data Dg, temporary minimum value data Dh, temporary maximum value position data Di, temporary minimum value position data Dj, next peak type flag data Dk, most recent peak type flag data Dl, maximum/minimum value position data Dm, valid peak data start number data Dn, amplitude data Do, ratio data Dp, image data Dq, and the like. Note that, in addition to data included in the information of FIG. 10, the main memory 33 stores data required for a game process, such as data (position data, etc.) about the object OBJ, other objects and the like appearing in a game, data about the virtual game space (data about background data, etc.), and the like.

The acceleration data buffer AccBuffer stores acceleration data included in a series of operational information transmitted as transmission data from the controller 7. The acceleration data includes X-axis direction acceleration data Da1, Y-axis direction acceleration data Da2, and Z-axis direction acceleration data Da3 which are detected separately along the X, Y and Z axes by the acceleration sensor 701 (three axial components). Note that the communication unit 6 included in the game apparatus main body 5 receives the acceleration data included in the operational information transmitted from the controller 7 in predetermined cycles (e.g., one cycle is 1/200 sec), and the acceleration data is stored into a buffer (not shown) included in the communication unit 6. Thereafter, the acceleration data is read out in units of one frame (e.g., every 1/60 sec) which is a game process cycle, and the acceleration data buffer AccBuffer of the main memory 33 is updated. In this example, the acceleration data Da is updated the number of times of transmission of acceleration data from the controller 7 in the past (e.g., 256).

Although it will be described in a process flow below as an example that the acceleration data buffer AccBuffer is updated in units of one frame (game process cycle), the buffer may be updated in other process cycles. For example, the acceleration data buffer AccBuffer may be updated in transmission cycles of the controller 7, and the acceleration data thus updated may be used in game process cycles. In this case, a cycle during which the acceleration data Da1 to Da3 stored in the acceleration data buffer AccBuffer is updated is different from the game process cycle.

The object angle data Db is data indicating an angle (object angle θobj) of the object OBJ in the virtual game world. The attitude angle data Dc is data indicating a static tilt (attitude angle θs) of the whole controller 7 in a real space. The cycle angle data Dd is data indicating a dynamic tilt (cycle angle θc) of the whole controller 7 which is calculated using a cycle of accelerations acting on the controller 7 in the real space. The cycle angle valid flag data De is data indicating a cycle angle valid flag Cfrg for determining whether or not the cycle angle θc indicated by the cycle angle data Dd is valid data.

The number-of-peaks data Df is data indicating the number of positive or negative peaks (hereinafter simply referred to as peaks) of accelerations indicated by an acceleration data history stored in the acceleration data buffer AccBuffer (the number of peaks Nm). The temporary maximum value data Dg is data indicating a temporary maximum value T which is temporarily set when a maximum value of the accelerations (a crest of the accelerations) is detected. The temporary minimum value data Dh is data indicating a temporary minimum value B which is temporarily set when a minimum value of the accelerations (a trough of the accelerations). The temporary maximum value position data Di is data indicating a position (temporary maximum value position Tin) in the acceleration data buffer AccBuffer at which the acceleration data indicated by the temporary maximum value T is stored. The temporary minimum value position data Dj is data indicating a position (temporary minimum value position Bin) in the acceleration data buffer AccBuffer at which the acceleration data indicated by the temporary minimum value B is stored. The next peak type flag data Dk is data indicating a next peak type flag Nfrg for determining whether a value to be next detected is a maximum value or a minimum value when a maximum value or a minimum value of the accelerations is detected. The most recent peak type flag data Dl is data indicating a most recent peak type flag Ffrg for determining whether a peak of a most recently detected acceleration is a maximum value or a minimum value. The maximum/minimum value position data Dm is data indicating a position (maximum/minimum value position Index) in the acceleration data buffer AccBuffer at which acceleration data indicating the determined maximum or minimum value is stored (specifically, the storage positions are indicated by numerical values of zero or more which are successively assigned to the detected maximum or minimum values). The valid peak data start number data Dn is data indicating what number is the maximum/minimum value position Index from which data starts indicating a valid maximum or minimum value (valid peak data start number Ms). The amplitude data Do is data indicating an amplitude h of the accelerations indicated by the acceleration data history. The ratio data Dp is data indicating a ratio a of a time from a peak of the accelerations to a current time point to a time between peaks of the accelerations.

The image data Dq includes object image data and the like. The object image data is data for placing the object OBJ in the virtual game space to generate a game image.

Figure 11:
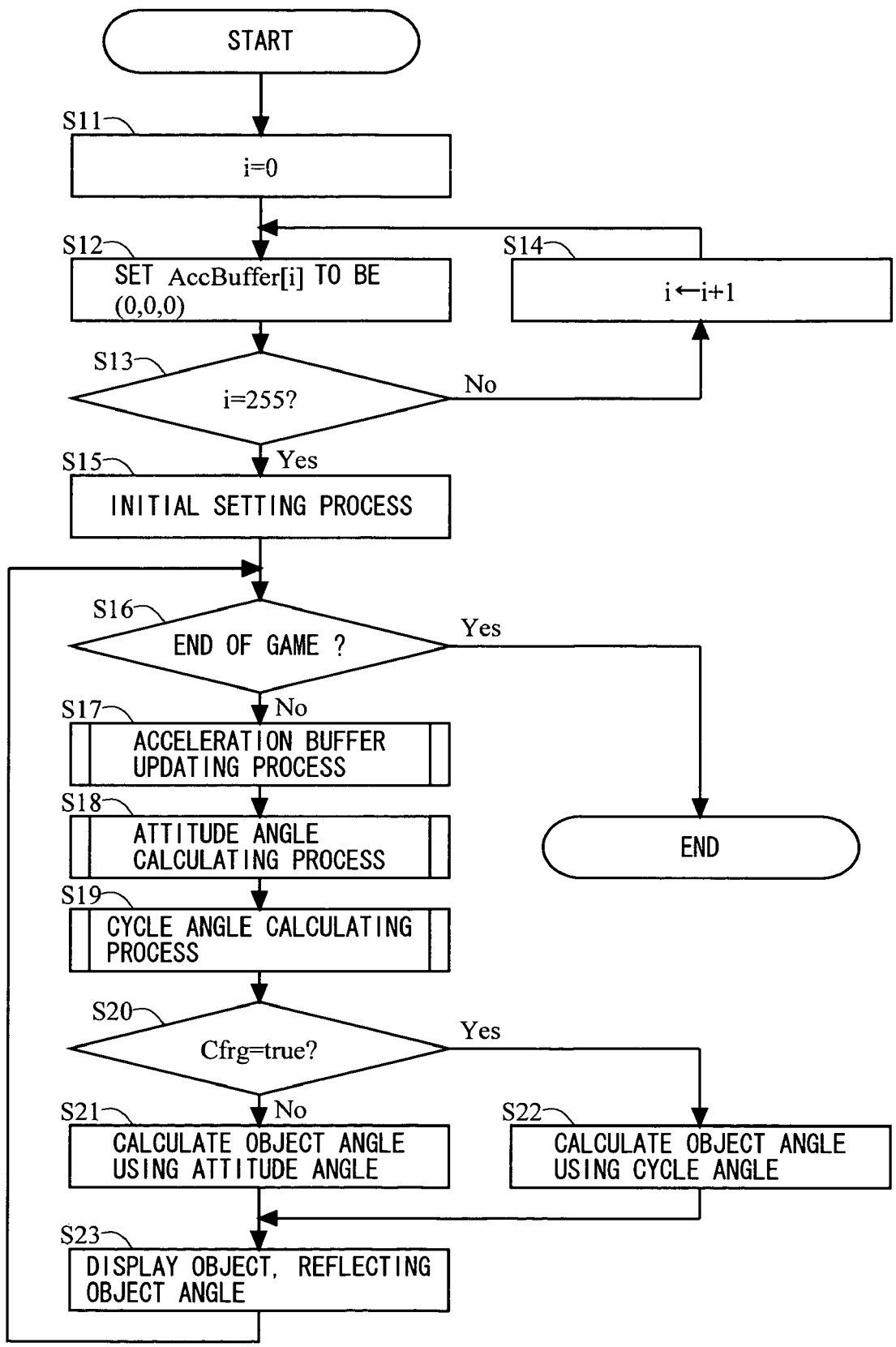
FIG. 11 is a flowchart illustrating a game process executed in the game apparatus main body 5.
Figure 12:
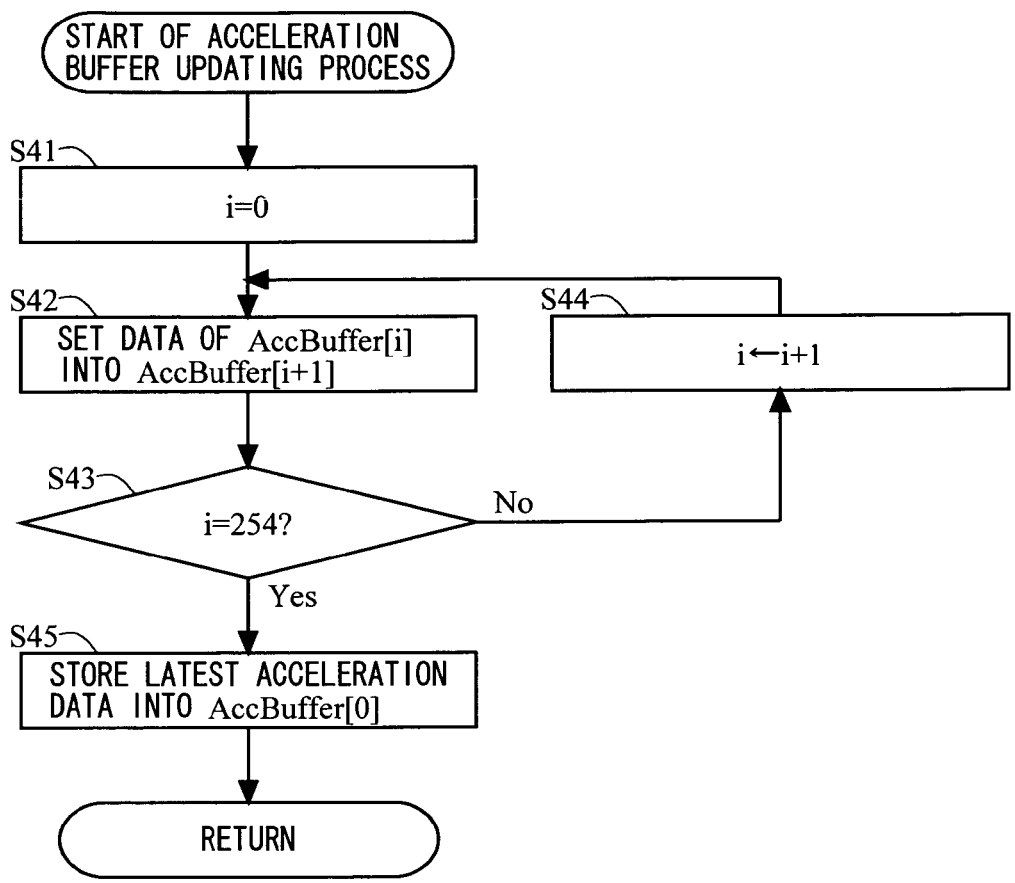
FIG. 12 is a diagram illustrating a subroutine indicating a detailed operation of an acceleration buffer updating process of step 17 in FIG. 11.
Figure 13:
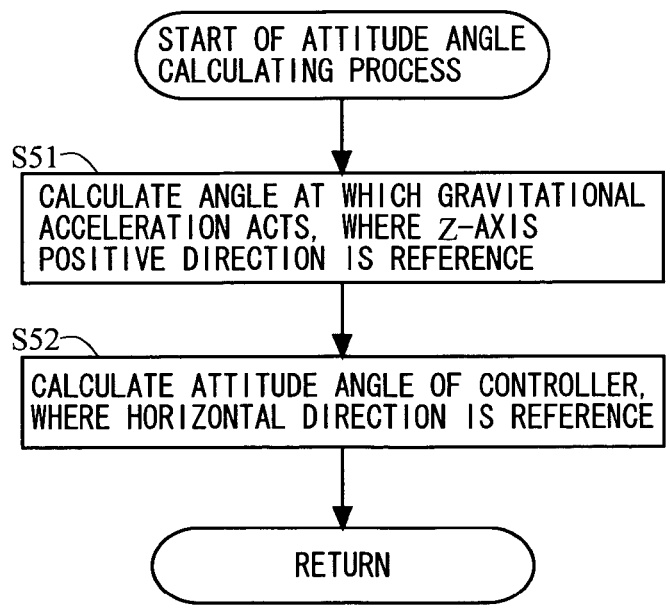
FIG. 13 is a diagram illustrating a subroutine indicating a detailed operation of an attitude angle calculating process of step 18 in FIG. 11.
Figure 14:
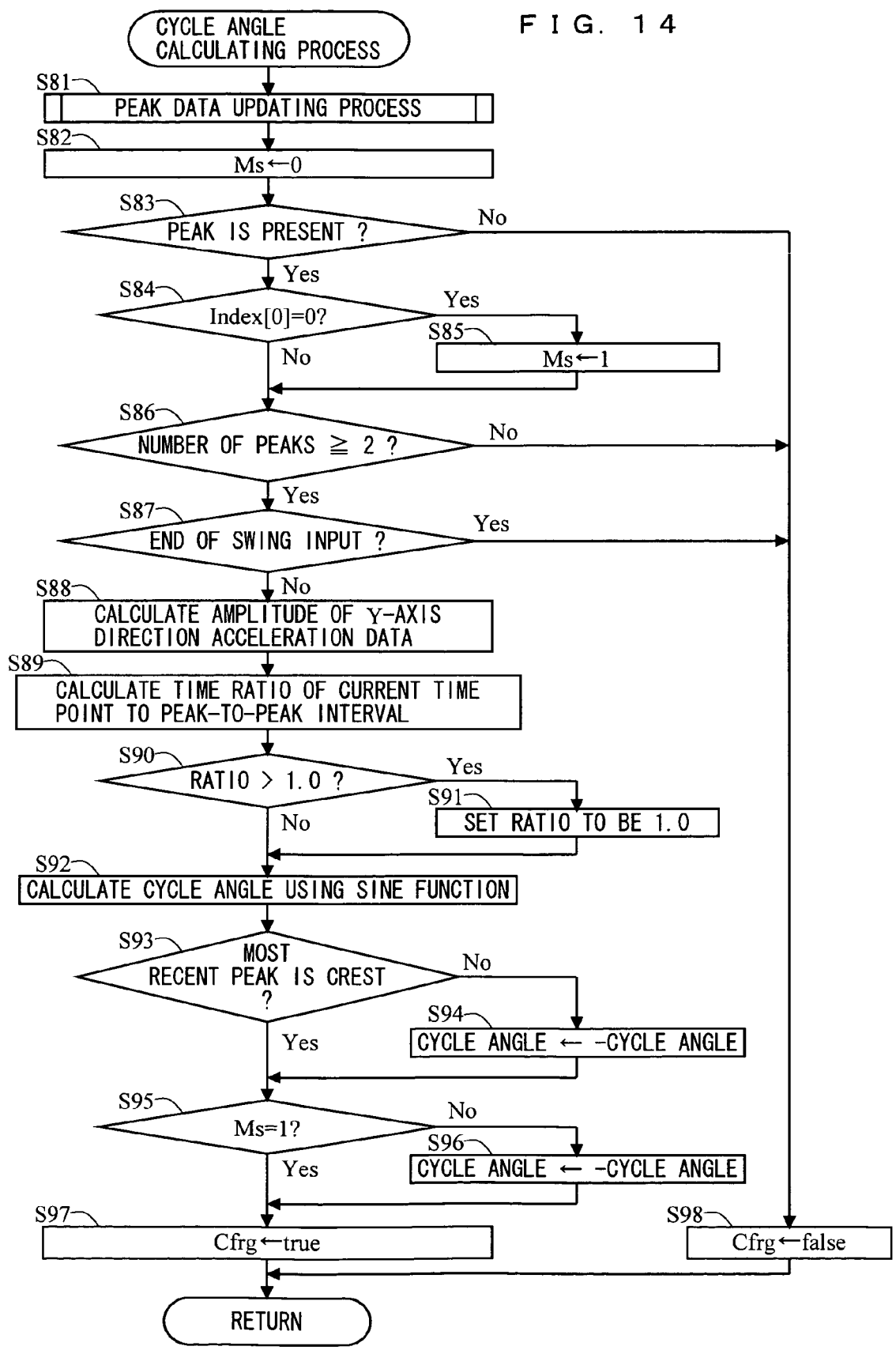
FIG. 14 is a diagram illustrating a subroutine indicating a detailed operation of a cycle angle calculating process of step 19 in FIG. 11.
Figure 15:
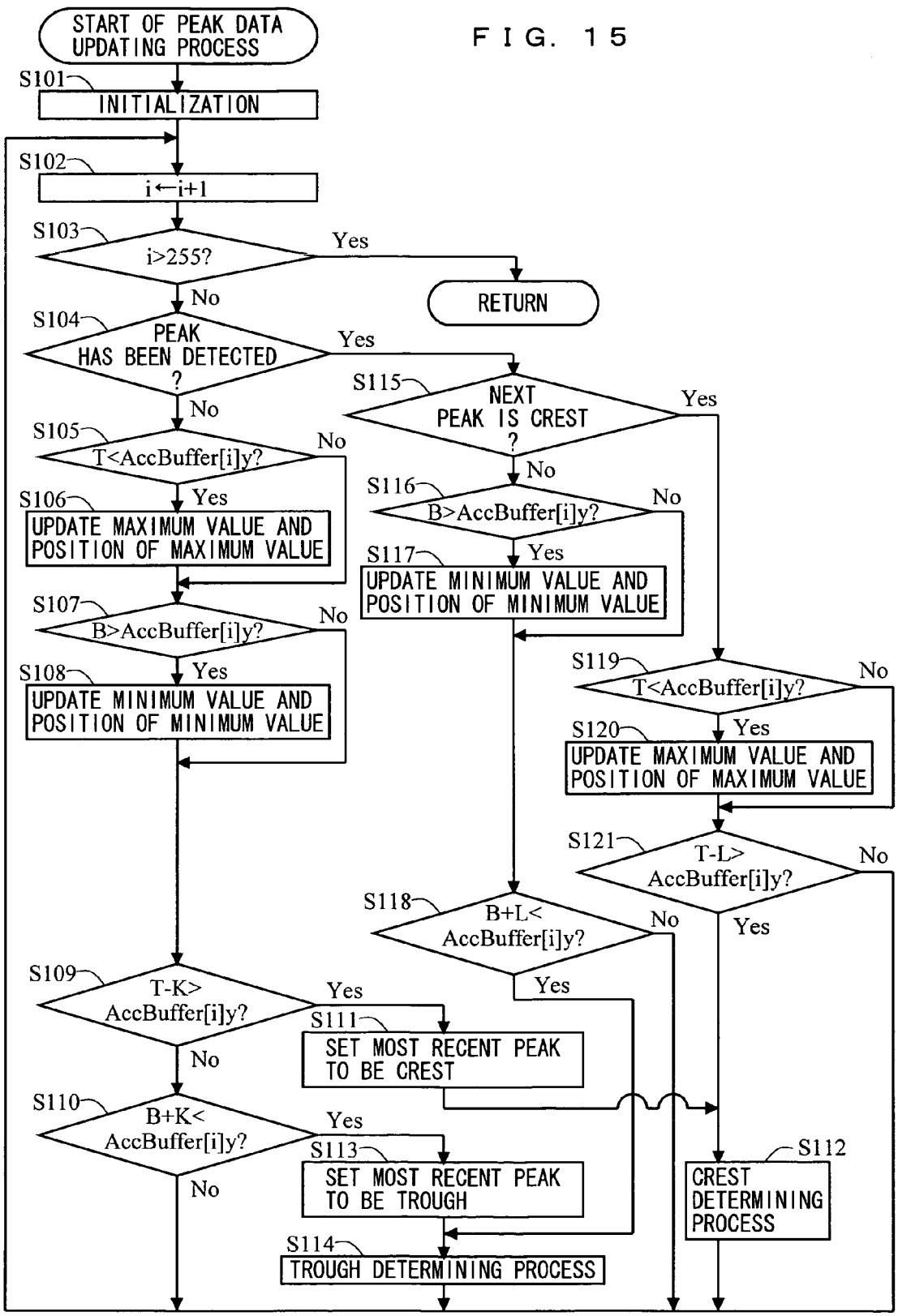
FIG. 15 is a diagram illustrating a subroutine indicating a detailed operation of a peak data updating process of step 81 in FIG. 14.
Figure 16:
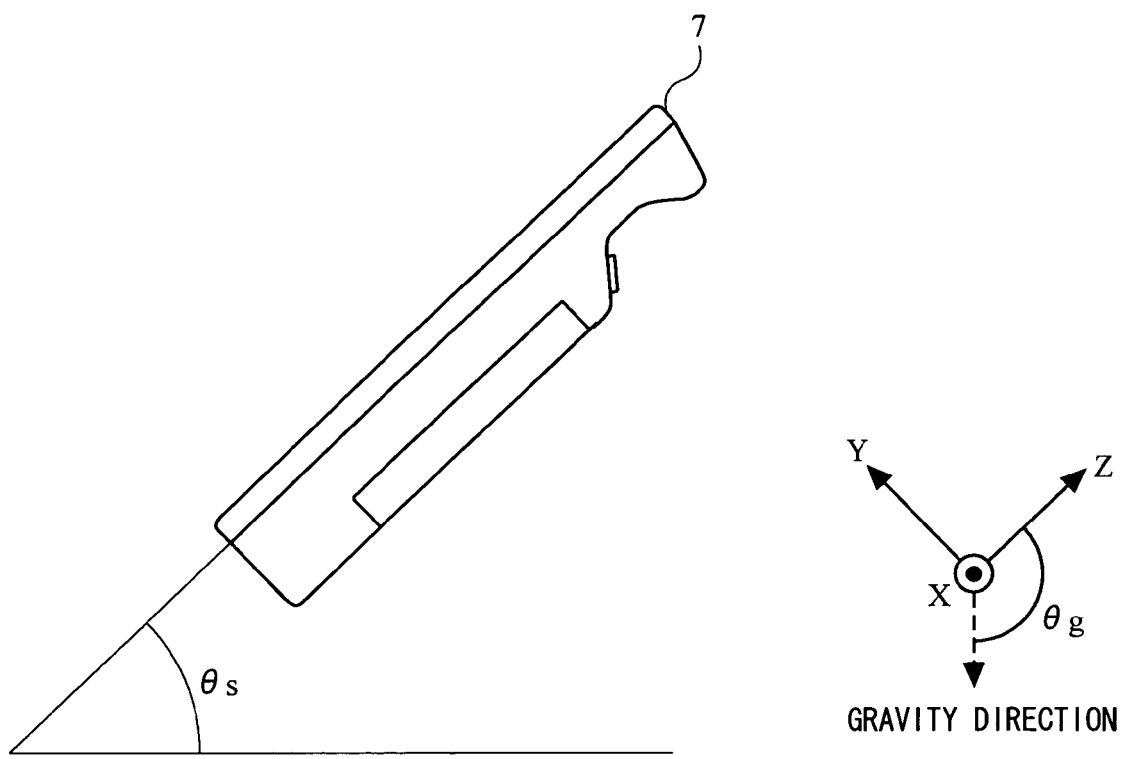
FIG. 16 is a diagram illustrating an exemplary state of the controller 7 which is statically tilted.
Figure 17:
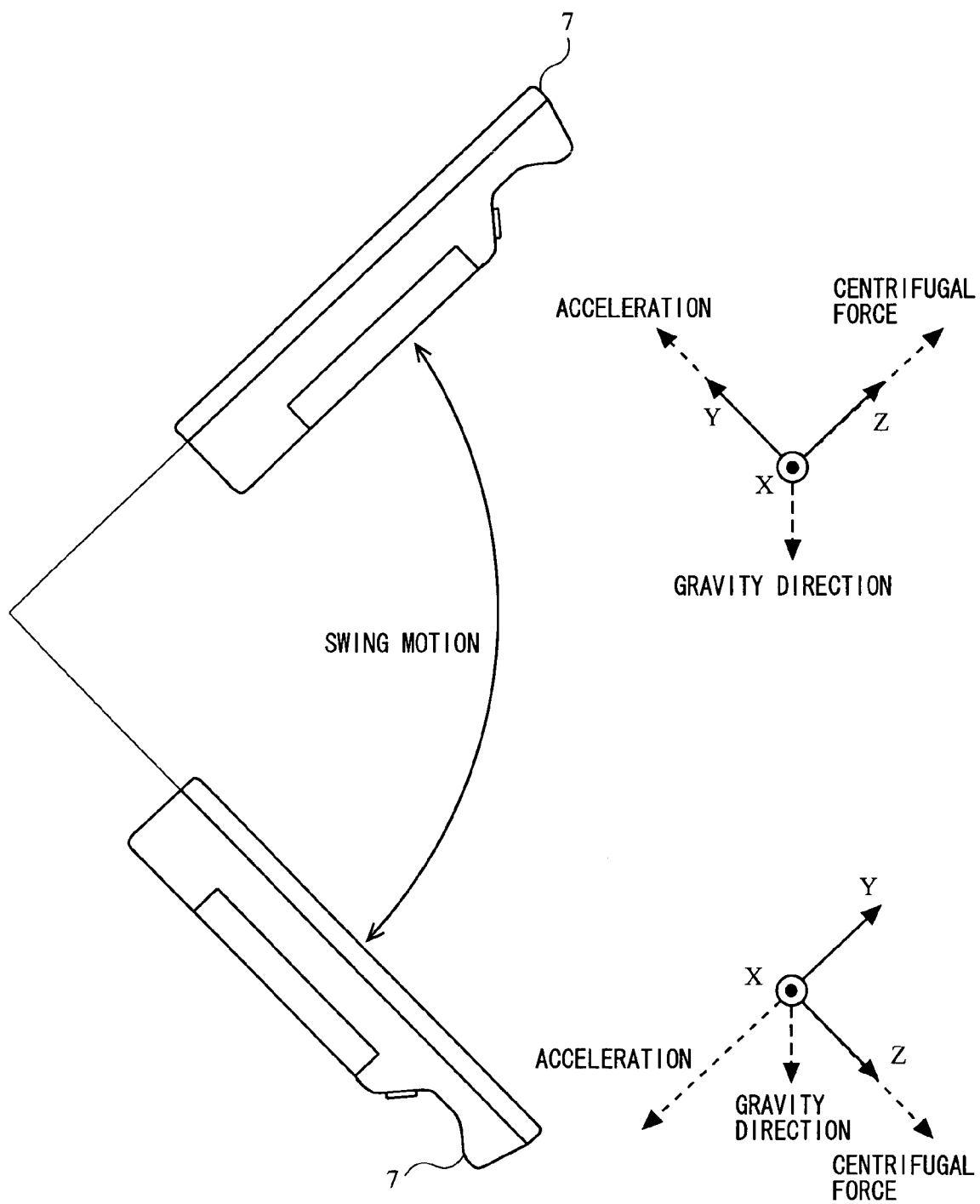
FIG. 17 is a diagram illustrating an exemplary state of the controller 7 being swung.
Figure 18:
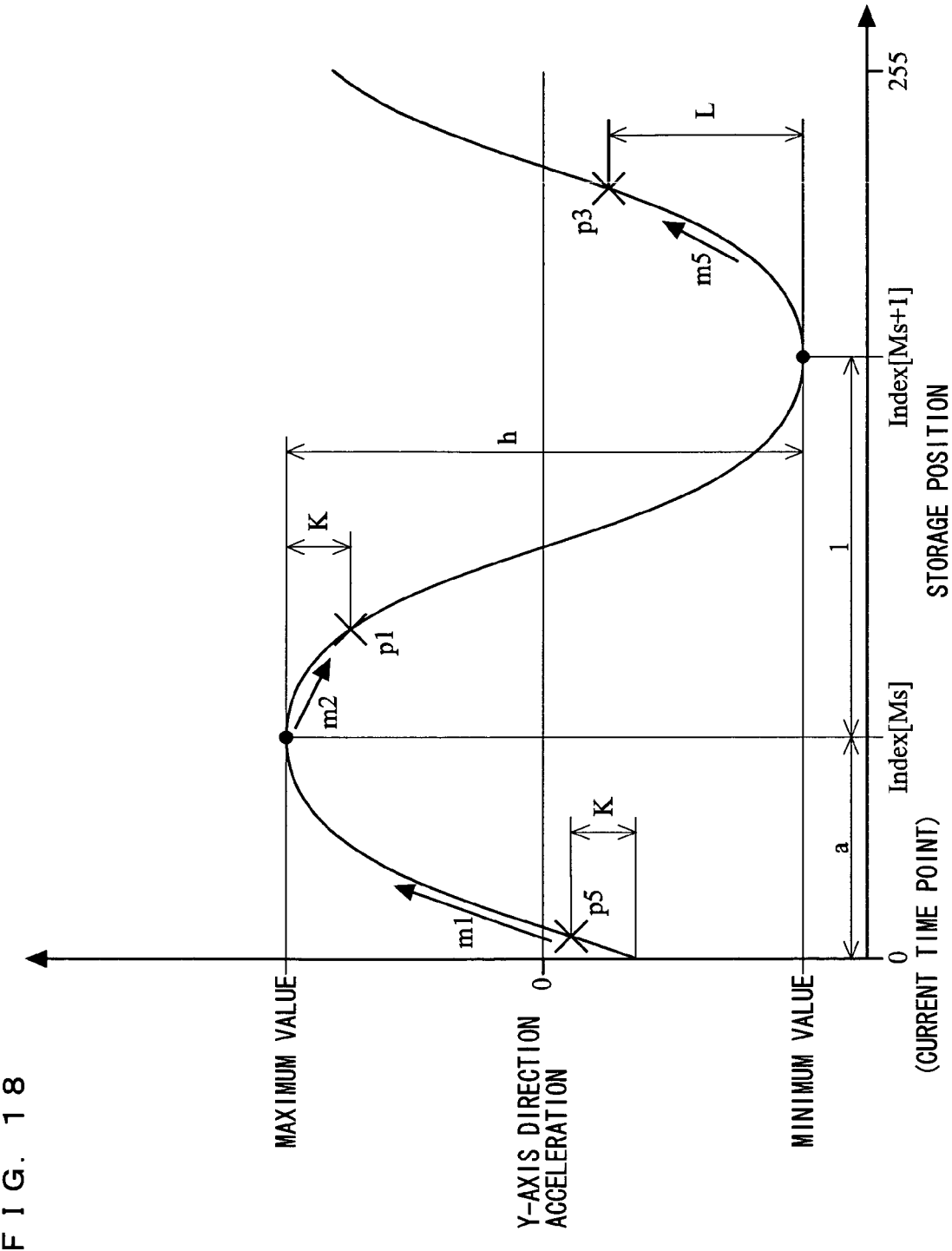
FIG. 18 is a diagram illustrating a first example of a variation in acceleration occurring in the controller 7 when the controller 7 is swung.
Figure 19:
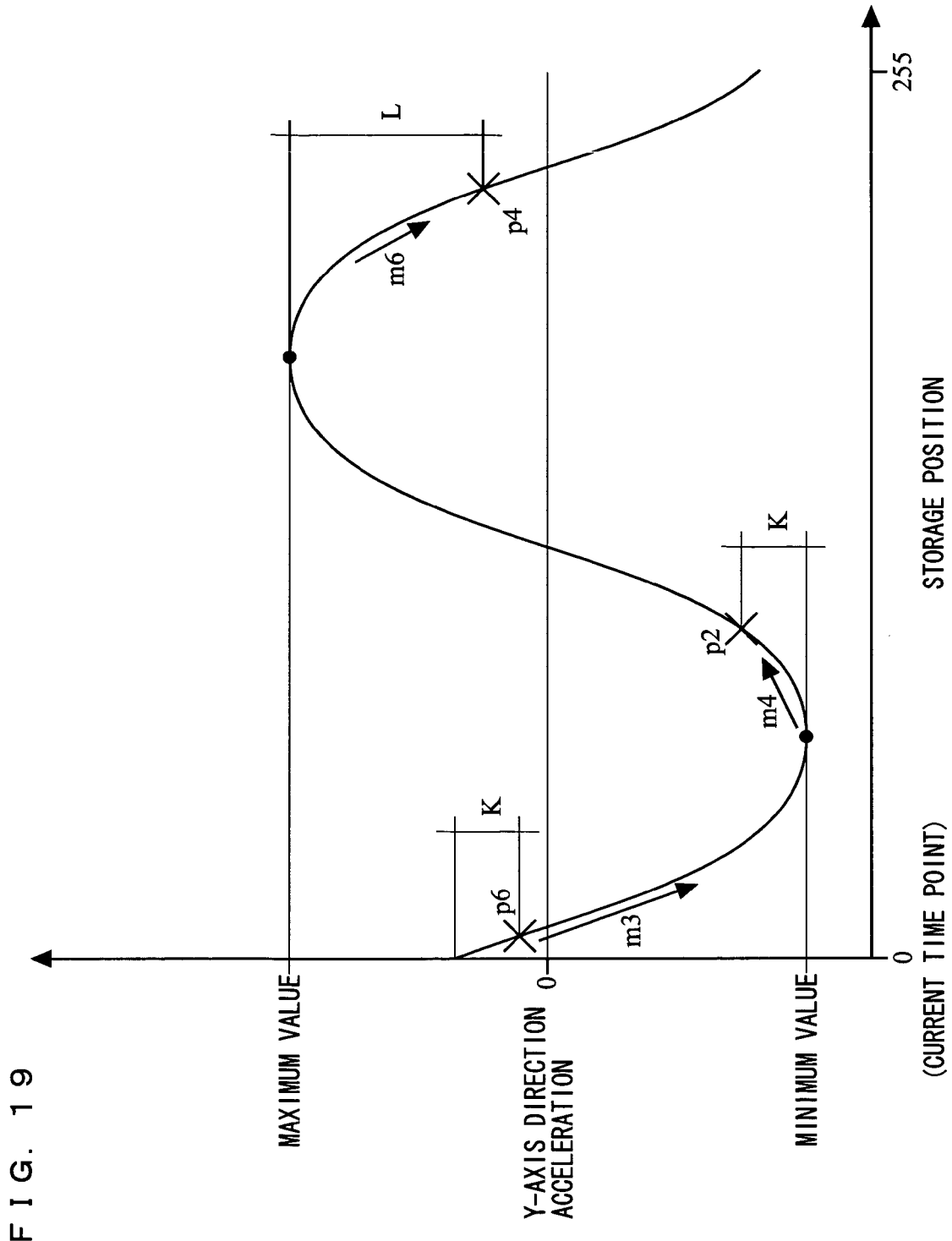
FIG. 19 is a diagram illustrating a second example of a variation in acceleration occurring in the controller 7 when the controller 7 is swung.
Figure 20:
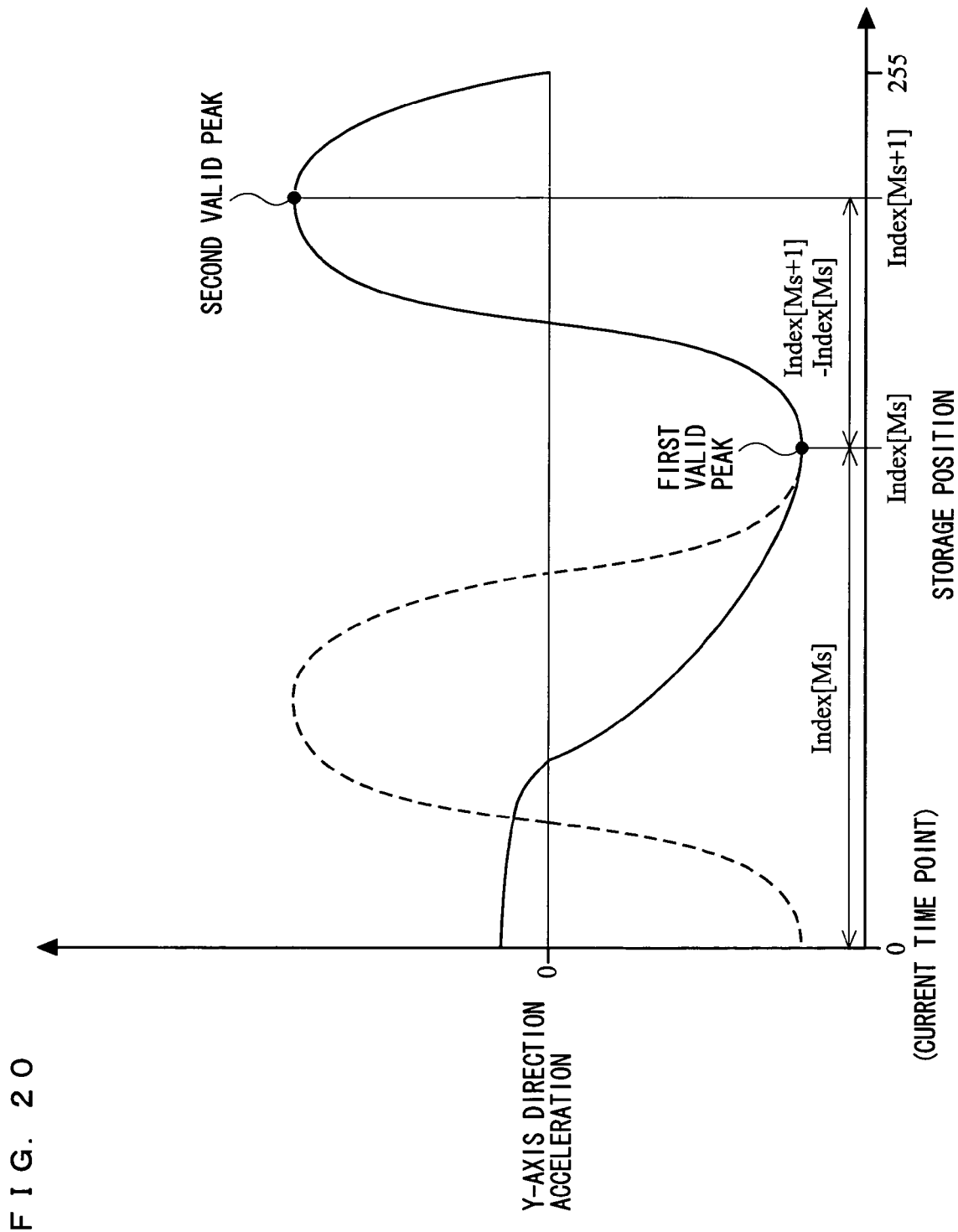
FIG. 20 is a diagram illustrating an example of a variation in acceleration when a player ends an operation of swinging the controller 7.
Figure 21:
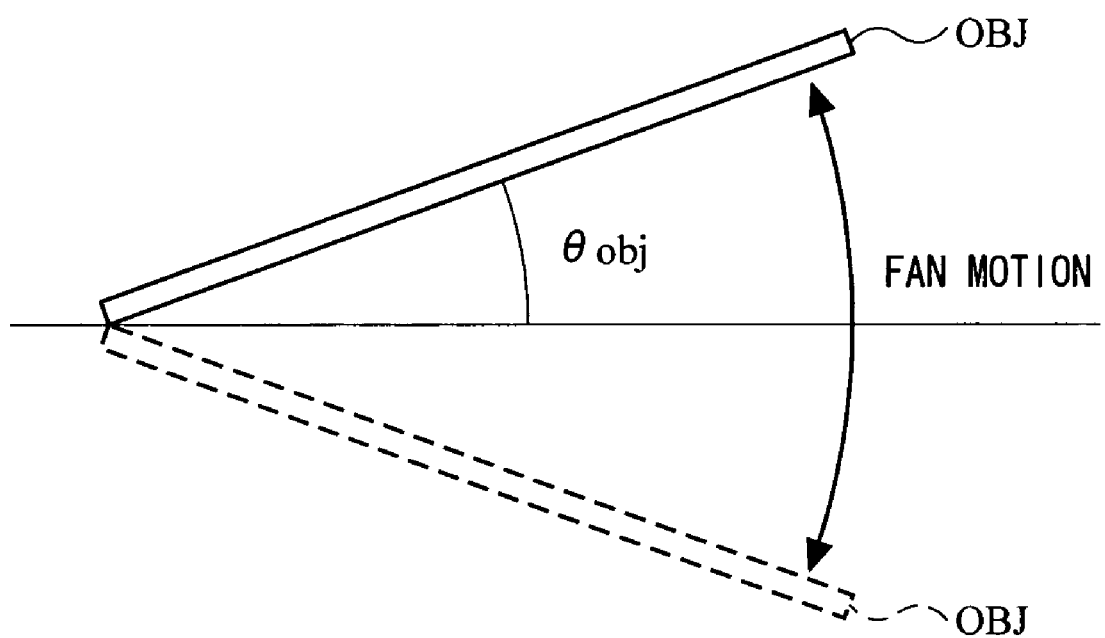
FIG. 21 is a side view of the object OBJ in a virtual game world.

Next, a game process executed in the game apparatus main body 5 will be described in detail with reference to FIGS. 11 to 21. Note that FIG. 11 is a flowchart illustrating the game process executed in the game apparatus main body 5. FIG. 12 illustrates a subroutine indicating a detailed operation of an acceleration buffer updating process of step 17 in FIG. 11. FIG. 13 illustrates a subroutine indicating a detailed operation of an attitude angle calculating process of step 18 in FIG. 11. FIG. 14 illustrates a subroutine indicating a detailed operation of a cycle angle calculating process of step 19 in FIG. 11. FIG. 15 illustrates a subroutine indicating a detailed operation of a peak data updating process of step 81 in FIG. 14. FIG. 16 is a diagram illustrating an exemplary state of the controller 7 which is statically tilted. FIG. 17 is a diagram illustrating an exemplary state of the controller 7 being swung. FIG. 18 is a diagram illustrating a first example of a variation in acceleration occurring in the controller 7 when the controller 7 is swung. FIG. 19 is a diagram illustrating a second example of a variation in acceleration occurring in the controller 7 when the controller 7 is swung. FIG. 20 is a diagram illustrating an example of a variation in acceleration when the player ends an operation of swinging the controller 7. FIG. 21 is a side view of the object OBJ in the virtual game world. Note that, of game processes, a motion of a player character PC which is expressed, depending on swinging of the controller 7 by the player, is described in the flowcharts of FIGS. 11 to 15, and other game processes which are not directly involved in the present invention will not be described in detail. In FIGS. 11 to 15, each step executed by the CPU 30 is abbreviated as "S".

When the game apparatus main body 5 is powered ON, the CPU 30 of the game apparatus main body 5 executes a boot program stored in a boot ROM (not shown), thereby initializing each unit, such as the main memory 33 and the like. Thereafter, a game program stored on the optical disc 4 is read into the main memory 33, and execution of the game program is started by the CPU 30. The flowcharts of FIGS. 11 to 15 indicate a game process after completion of the above-described process.

In FIG. 11, the CPU 30 sets a temporary variable i used in a process loop to be 0 (step 11). Next, the CPU 30 sets the acceleration data Da1 to Da3 at a storage position [i] in the acceleration data buffer AccBuffer to be (0, 0, 0) (step 12). Thereafter, the CPU 30 determines whether or not the current temporary variable i is 255 (step 13). When the temporary variable i is not 255, the CPU 30 adds 1 to the temporary variable i (step 14), and returns to step 12 and repeats the process of step 12. On the other, when the temporary variable i is 255, the CPU 30 goes to a process of the next step 15. By the processes of steps 11 to 14, 256 sets of acceleration data Da1 to Da3 stored at respective storage positions [0] to [255] in the acceleration data buffer AccBuffer are all set to be (0, 0, 0).

In step 15, the CPU 30 executes an initial setting process for a game process (step 15), and goes to the next step. For example, the CPU 30 initializes each data in the main memory 33 by providing the following settings: the object angle θobj=0; the attitude angle θs=0; the cycle angle θc=0; and the cycle angle valid flag Cfrg=false.

Next, the CPU 30 determines whether or not a game is ended (step 16). The game may be ended under a condition that the game is over (the game is successful or failed), a condition that the player performs an operation of ending the game, or the like. The CPU 30 goes to the next step 17 when the game is not ended, and ends the flowchart when the game is ended.

In step 17, the CPU 30 executes the acceleration buffer updating process, and goes to the next step. Hereinafter, the acceleration buffer updating process of step 17 will be described with reference to FIG. 12.

In FIG. 12, the CPU 30 sets the temporary variable i used in the process loop to be 0 (step 41). Next, the CPU 30 moves the acceleration data Da1 to Da3 at a storage position [i] in the acceleration data buffer AccBuffer to a storage position [i+1] (step 42). Thereafter, the CPU 30 determines whether or not the current temporary variable i is 254 (step 43). When the temporary variable i is not 254, the CPU 30 adds 1 to the temporary variable i (step 44), and returns to step 42 and repeats the process of step 42. On the other hand, when the temporary variable i is 254, the CPU 30 goes to the next step 45.

In step 45, the CPU 30 stores the latest acceleration data Da1 to Da3 (acceleration data Da1 to Da3 included in the latest operational information received from the controller 7) at the storage position [0] in the acceleration data buffer AccBuffer, and ends the process of the subroutine. By the processes of steps 41 to 45, the storage positions of 255 sets of acceleration data Da1 to Da3 stored in the storage positions [0] to [254] are each shifted to the next higher storage position in the acceleration data buffer AccBuffer, and the latest acceleration data Da1 to Da3 are stored into the storage position [0].

Referring back to FIG. 11, after the acceleration buffer updating process of step 17, the CPU 30 executes the attitude angle calculating process (step 18), and goes to the next step. Hereinafter, the attitude angle calculating process of step 18 will be described with reference to FIG. 13.

In FIG. 13, the CPU 30 calculates an angle θg at which the gravitational acceleration acts on the controller 7, where the positive direction of the Z axis of the controller 7 is a reference (step 51). Thereafter, the CPU 30 uses the angle θg to calculate the attitude angle θs indicating the attitude of the controller 7, where a horizontal direction in the real space is a reference, and stores the attitude angle data Dc into the main memory 33 (step 52). Thus, the process of the subroutine is ended.

Here, a relationship between the tilt and the attitude angle θs of the controller 7 will be described with reference to FIG. 16. For example, as illustrated in FIG. 16, an angle of the controller 7 tilted from the horizontal direction so that the front surface of the controller 7 faces upward is the attitude angle θs. When the controller 7 is held still so that the front surface of the controller 7 faces upward with the upper surface being tilted at the attitude angle θs, the acceleration sensor 701 of the controller 7 detects a static gravitational acceleration occurring in a direction between the negative direction of the Y axis and the negative direction of the Z axis. Thereafter, the CPU 30 calculates the angle θg at which the gravitational acceleration acts on the controller 7, depending on an output from the acceleration sensor 701 which has detected the gravitational acceleration, where the positive direction of the Z axis of the controller 7 is a reference. For example, the angle θg is calculated by:

$$\theta g = a\cos(Za/\sqrt{Xa^2+Ya^2+Za^2})$$

where a cos represents a function which returns the value of an arc cosine in radians, Xa represents an acceleration indicated by the X-axis direction acceleration data Da1 stored at the storage position [0] in the acceleration buffer AccBuffer, Ya represents an acceleration indicated by the Y-axis direction acceleration data Da2 stored at the storage position [0] in the acceleration buffer AccBuffer, and Za represents an acceleration indicated by the Z-axis direction acceleration data Da3 stored at the storage position [0] in the acceleration buffer AccBuffer. Thereafter, the CPU 30 uses the angle θg to calculate the attitude angle θs indicating the attitude of the controller 7, where the horizontal direction in the real space is a reference. For example, the attitude angle θs is calculated by:

$$\theta s = \theta g - \pi/2.$$

Referring back to FIG. 11, after the attitude angle calculating process of step 18, the CPU 30 executes the cycle angle calculating process (step 19), and goes to the next step. Hereinafter, the cycle angle calculating process of step 19 will be described with reference to FIG. 14.

In FIG. 14, the CPU 30 executes the peak data updating process (step 81), and goes to the next step. Hereinafter, the peak data updating process of step 81 will be described with reference to FIG. 15.

In FIG. 15, the CPU 30 initializes the peak data updating process (step 101), and goes to the next step. For example, the CPU 30 initializes each data in the main memory 33 by providing the following settings: the number of peaks Nm=0; the temporary variable i=0; the temporary maximum value T=AccBuffer[0]y; the temporary minimum value B=AccBuffer[0]y; the next peak type flag Nfrg=false; the temporary maximum value position Tin=0; the temporary minimum value position Bin=0; and the most recent peak type flag Ffrg=false. Note that AccBuffer[0]y represents an acceleration indicated by the Y-axis direction acceleration data Da2 stored at the storage position [0] in the acceleration buffer AccBuffer. Hereinafter, an acceleration indicated by the Y-axis direction acceleration data Da2 stored at the storage position [i] in the acceleration buffer AccBuffer is represented by AccBuffer[i]y.

Next, the CPU 30 adds 1 to the temporary variable i (step 102). Next, the CPU 30 determines whether or not the current temporary variable i is a value larger than 255 (step 103). When the temporary variable i is smaller than or equal to 255, the CPU 30 goes to the next step 104. On the other hand, when the temporary variable i is larger than 255, the CPU 30 ends the process of the subroutine.

In step 104, the CPU 30 determines whether or not at least one acceleration peak has already been detected, in the peak data updating process. Specifically, the CPU 30 references the number-of-peaks data Df, and if the number of peaks Nm=0, determines that no acceleration peak has been detected. When no acceleration peak has been detected, the CPU 30 goes to the next step 105. On the other hand, when an acceleration peak has already been detected, the CPU 30 goes to the next step 115.

Here, an acceleration which is detected when the controller 7 is swung vertically will be described with reference to FIGS. 17 and 18. As illustrated in FIG. 17, when the player swings the controller 7 vertically, the acceleration sensor 701 of the controller 7 detects a centrifugal force and an acceleration in a swing direction or in an anti-swing direction which are caused by swinging the controller 7, in addition to the static gravitational acceleration. Here, if a centrifugal force component and a swing- or anti-swing-direction acceleration component can be extracted using the output of the acceleration sensor 701, an operational angle of the controller 7 when the centrifugal force and the acceleration act on the controller 7 can be analyzed. Here, attention will be paid to an acceleration acting on the Y-axis direction of the controller 7. As illustrated in FIG. 17, a direction in which the Y-axis direction acceleration acts on the controller 7 when the controller 7 is swung upward, is opposite to a direction in which the Y-axis direction acceleration acts on the controller 7 when the controller 7 is swung downward. In other words, when the player swings the controller 7, the Y-axis direction acceleration varies in a cyclic manner, depending on the swing cycle.

For example, as illustrated in FIG. 18, when the player swings the controller 7, the acceleration acting on the controller 7 in the Y-axis direction varies while repeatedly taking a positive-direction peak (maximum value) and a negative-direction peak (minimum value). If the cyclicality, the current position with respect to a peak, the amplitude of a variation in acceleration, and the like of the acceleration are analyzed, a cycle (speed) in which the player swings the controller 7, an angle over which the controller 7 is swung (cycle angle), a swing strength, and the like can be calculated. In the process of step 104, it is determined whether or not such a peak has already been detected in the acceleration history stored in the acceleration buffer AccBuffer.

Referring back to FIG. 15, in step 105, the CPU 30 references AccBuffer[i]y to determine whether or not AccBuffer[i]y is larger than the temporary maximum value T. Thereafter, when T<AccBuffer[i]y, the CPU 30 sets AccBuffer[i]y into the temporary maximum value T and updates the temporary maximum value data Dg, and sets the temporary variable i into the temporary maximum value position Tin and updates the temporary maximum value position data Di (step 106), and goes to the next step 107. On the other hand, when T≧AccBuffer[i]y, the CPU 30 directly goes to the next step 107.

In step 107, the CPU 30 references AccBuffer[i]y to determine whether or not AccBuffer[i]y is smaller than the temporary minimum value B. When B>AccBuffer[i]y, the CPU 30 sets AccBuffer[i]y into the temporary minimum value B and updates the temporary minimum value data Dh, and sets the temporary variable i into the temporary minimum value position Bin and updates the temporary minimum value position data Dj (step 108), and goes to the next step 109. On the other hand, when B≦AccBuffer[i]y, the CPU 30 directly goes to the next step 109.

In step 109, the CPU 30 references AccBuffer[i]y to determine whether or not AccBuffer[i]y is smaller than a value obtained by subtracting a constant K (e.g., 0.5 G) from the temporary maximum value T. When T−K>AccBuffer[i]y, the CPU 30 goes to the next step 111. On the other hand, when T−K≦AccBuffer[i]y, the CPU 30 goes to the next step 110.

In step 110, the CPU 30 references AccBuffer[i]y to determine whether or not AccBuffer[i]y is larger than a value obtained by adding the constant K (e.g., 0.5 G) to the temporary minimum value B. When B+K<AccBuffer[i]y, the CPU 30 goes to the next step 113. On the other hand, when B+K≧AccBuffer[i]y, the CPU 30 returns to step 102 and repeats the process of step 102.

In step 111, the CPU 30 sets the most recent peak type flag Ffrg to be true and updates the most recent peak type flag data Dl. Thereafter, the CPU 30 executes a crest determining process (step 112), and returns to step 102 and repeats the process of step 102. For example, in the crest determining process, the CPU 30 sets AccBuffer[i]y into the temporary minimum value B and updates the temporary minimum value data Dh, sets the temporary maximum value position Tin into the maximum/minimum value position Index [Nm] and updates the maximum/minimum value position data Dm, adds 1 to the number of peaks Nm and updates the number-of-peaks data Df, and sets the next peak type flag Nfrg to be false and updates the next peak type flag data Dk. By the crest determining process, it is finally determined that a current acceleration at the temporary maximum value position Tin indicating the temporary maximum value T is a maximum value. Hereinafter, the principle of determination of a maximum value of accelerations will be described with reference to FIG. 18.

In the processes of steps 105 and 106, it is determined successively from the storage position [0] whether or not an acceleration indicated by the Y-axis direction acceleration data is the largest one of accelerations which have already been evaluated, and when the acceleration is the largest, the maximum value candidate is updated. For example, as illustrated in FIG. 18, when the acceleration gradually increases from the storage position [0] to reach a maximum value, the maximum value candidate is updated successively from the storage position [0] to a storage position indicating the maximum value (m1 in FIG. 18). Thereafter, when the acceleration passes the storage position indicating the maximum value and then gradually decreases (m2 in FIG. 18), an acceleration stored at each storage position is smaller than the maximum value candidate, so that the maximum value candidate is not updated. Thereafter, when the acceleration decreases to a value obtained by subtracting the constant K from the maximum value candidate by the process of step 109 (p1 in FIG. 18), the maximum value candidate is finally determined as a maximum value. This is for the purpose of preventing a plurality of maximum values from being detected due to a variation in acceleration in the vicinity of the maximum value or preventing a still gradually increasing or decreasing acceleration from being erroneously finally determined as a maximum value, if the maximum value is finally determined when the acceleration gradually decreases after passing the storage position indicating the maximum value. Although the constant K is set to be, for example, 0.5 G, the constant K may be set as appropriate, depending on the detection precision, the detection range or the like of the acceleration.

Referring back to FIG. 15, in step 113, the CPU 30 sets the most recent peak type flag Ffrg to be false and updates the most recent peak type flag data Dl. Thereafter, the CPU 30 executes a trough determining process (step 114), and returns to step 102 and repeats the process of step 102. For example, in the trough determining process, the CPU 30 sets AccBuffer[i]y into the temporary maximum value T and updates the temporary maximum value data Dg, sets the temporary minimum value position Bin into the maximum/minimum value position Index [Nm] and updates the maximum/minimum value position data Dm, and adds 1 to the number of peaks Nm and updates the number-of-peaks data Df, and sets the next peak type flag Nfrg to be true and updates the next peak type flag data Dk. By the trough determining process, it is finally determined that a current acceleration at the temporary minimum value position Bin indicating the temporary minimum value B is a minimum value. Hereinafter, the principle of determination of a minimum value of accelerations will be described with reference to FIG. 19.

In the processes of steps 107 and 108, it is determined successively from the storage position [0] whether or not an acceleration indicated by the Y-axis direction acceleration data is the smallest one of accelerations which have already been evaluated, and when the acceleration is the smallest, the minimum value candidate is updated. For example, as illustrated in FIG. 19, when an acceleration gradually decreases from the storage position [0] to reach a minimum value, the minimum value candidate is updated successively from the storage position [0] to a storage position indicating the minimum value (m3 in FIG. 19). Thereafter, when the acceleration passes the storage position indicating the minimum value and gradually increases (m4 in FIG. 19), an acceleration stored at each storage position is larger than the minimum value candidate, so that the minimum value candidate is not updated. Thereafter, when the acceleration increases to a value obtained by adding the constant K to the minimum value candidate by the process of step 110 (p2 in FIG. 19), the minimum value candidate is finally determined as a minimum value. This is for the purpose of preventing a plurality of minimum values from being detected due to a variation in acceleration in the vicinity of the minimum value or preventing a still gradually increasing or decreasing acceleration from being erroneously finally determined as a minimum value, if the minimum value is finally determined when the acceleration gradually increases after passing the storage position indicating the minimum value as in the case of the maximum value.

Referring back to FIG. 15, in step 104, when at least one acceleration peak has already been detected, the CPU 30 determines whether or not the next detected peak is a crest (step 115). Specifically, the CPU 30 references the next peak type flag data Dk, and when the next peak type flag Nfrg=true, determines that the next detected peak is a crest. When the next detected peak is not a crest (i.e., a trough), the CPU 30 goes to the next step 116. On the other hand, when the next detected peak is a trough, the CPU 30 goes to the next step 119.

Processes of steps 116 and 117 are processes for detecting a minimum value of accelerations as in steps 107 and 108. After at least one maximum value has already been determined, a minimum value which is expected to appear next is detected. The processes of steps 116 and 117 are similar to those of steps 107 and 108 and will not be described in detail.

After the processes of steps 116 and 117, the CPU 30 references AccBuffer[i]y to determine whether or not AccBuffer[i]y is larger than a value obtained by adding a constant L (e.g., 2.0 G) to the temporary minimum value B (step 118). When B+L<AccBuffer[i]y, the CPU 30 goes to step 114 (trough determining process). On the other hand, B+L≧AccBuffer[i]y, the CPU 30 returns to step 102 and repeats the process of step 102.

For example, as illustrated in FIG. 18, after a maximum value is finally determined, when the acceleration passes a storage position indicating a minimum value and gradually increases (m5 in FIG. 18), and the acceleration increases to a value obtained by adding the constant L to the minimum value candidate (p3 in FIG. 18), the minimum value candidate is finally determined as a minimum value. This is also for the purpose of preventing a plurality of minimum values from being detected due to a variation in acceleration in the vicinity of the minimum value or preventing a still gradually increasing or decreasing acceleration from being erroneously finally determined as a minimum value, if the minimum value is finally determined when the acceleration gradually increases after passing the storage position indicating the minimum value. Although the constant L is set to be, for example, 2.0 G, the constant L may be set as appropriate, depending on the detection precision, the detection range or the like of the acceleration.

Processes of steps 119 and 120 are processes for detecting a maximum value of accelerations as in steps 105 and 106. Specifically, a maximum value which is expected to appear next after at least one minimum value has already been determined, is detected. The processes of steps 119 and 120 are similar to those of steps 105 and 106, and will not be described in detail.

After the processes of steps 119 and 120, the CPU 30 references AccBuffer[i]y to determine whether or not AccBuffer[i]y is smaller than a value obtained by subtracting the constant L (e.g., 2.0 G) from the temporary maximum value T (step 121). When T−L>AccBuffer[i]y, the CPU 30 goes to step 112 (crest determining process). On the other hand, when T−L≦AccBuffer[i]y, the CPU 30 returns to step 102 and repeats the process of step 102.

For example, as illustrated in FIG. 19, after the minimum value is determined, when the acceleration passes a storage position indicating a maximum value and gradually decreases (m6 in FIG. 19), and decreases to a value obtained by subtracting the constant L from the maximum value candidate (p4 in FIG. 19), the maximum value candidate is determined as a maximum value. This is for the purpose of preventing a plurality of maximum values from being detected due to a variation in acceleration in the vicinity of the maximum value or preventing a still gradually increasing or decreasing acceleration from being erroneously finally determined as a maximum value, if the maximum value is finally determined when the acceleration gradually decreases after passing the storage position indicating the maximum value.

Thus, by the peak data updating process, the number of acceleration peaks, a storage position indicating an acceleration peak, the magnitude of an acceleration at an acceleration peak, and the like are detected in the acceleration history stored in the acceleration data buffer AccBuffer.

Referring back to FIG. 14, after the peak data updating process of step 81, the CPU 30 sets the valid peak data start number Ms to be 0 and updates the valid peak data start number data Dn (step 82), and goes to the next step.

Next, the CPU 30 determines whether or not there is an acceleration peak in the peak data updating process of step 81 (step 83). For example, when the number of peaks Nm indicated by the number-of-peaks data Df is set to be a numerical value of 1 or more, the CPU 30 determines that there is an acceleration peak. When there is an acceleration peak, the CPU 30 goes to the next step 84. On the other hand, when there is no acceleration peak (Nm=0), the CPU 30 goes to the next step 98.

In step 84, the CPU 30 references the maximum/minimum value position data Dm to determine whether or not the maximum/minimum value position Index [0]=0. When the maximum/minimum value position Index [0]=0, the CPU 30 sets the valid peak data start number Ms to be 1 and updates the valid peak data start number data Dn (step 85), and goes to the next step 86. On the other hand, when the maximum/minimum value position Index [0]≠0, the CPU 30 directly goes to the next step 86.

Here, the purpose of the processes of steps 84 and 85 will be described with reference to FIGS. 18 and 19. In the peak data updating process, both the temporary maximum value T and the temporary minimum value B are set into AccBuffer [0]y (values of the Y-axis direction acceleration at the storage position [0]) in the initialization of step 101. After thus setting the temporary maximum value T and the temporary minimum value B, when a variation in acceleration occurs as illustrated in FIG. 18, the temporary minimum value B is not updated from the storage position [0] to a storage position indicating a maximum value (m1 in FIG. 18). Therefore, when the acceleration increases to a value obtained by adding the constant K to the temporary minimum value B (p5 in FIG. 18), the temporary minimum value B is determined as the first peak. In this case, since the minimum value is stored as the first peak at the storage position [0], the maximum/minimum value position Index [0] is set to be 0. On the other hand, when a variation in acceleration occurs as illustrated in FIG. 19, the temporary maximum value T is not updated from the storage position [0] to a storage position indicating a minimum value (m3 in FIG. 19). Therefore, when the acceleration decreases to a value obtained by subtracting the constant K from the temporary maximum value T (p6 in FIG. 18), the temporary maximum value T is determined as the first peak. Also in this case, since the maximum value is stored as the first peak at the storage position [0], the maximum/minimum value position Index [0] is set to be 0.

Although neither the point p5 nor the point p6 is an acceleration peak, the points p5 and p6 are determined to have a maximum value or a minimum value. The points p5 and p6 should be distinguished from true peaks. Therefore, in the processes of steps 84 and 85, when the maximum/minimum value position Index [0]=0, the valid peak data start number Ms is set to be 1 (i.e., the first peak is invalid) so as to distinguish an acceleration at the storage position [0] from a true peak.

Referring back to FIG. 14, in step 86, it is determined whether or not there are two or more valid acceleration peaks in the peak data updating process of step 81. For example, when the number of peaks Nm indicated by the number-of-peaks data Df is set to be a value larger than a value obtained by adding 1 to the valid peak data start number Ms, the CPU 30 determines that there are two or more valid acceleration peaks. When there are two or more valid acceleration peaks, the CPU 30 goes to the next step 87. On the other hand, when there are less than two valid acceleration peaks, the CPU 30 goes to the next step 98.

In step 87, the CPU 30 determines whether or not the player has ended the operation of swinging the controller 7. For example, when a time from a current time point to a most recent acceleration peak is larger than a predetermined factor (e.g., 1.5) times a time between acceleration peaks, the CPU 30 determines that the player has ended the operation of swinging the controller 7. Specifically, the CPU 30 determines that the player has ended the operation of swinging the controller 7, if:

$$\text{Index}[Ms] > (\text{Index}[Ms-1] - \text{Index}[Ms]) * 1.5.$$

When the player continues the operation of swinging the controller 7, the CPU 30 goes to the next step 88. On the other hand, when the player has ended the operation of swinging the controller 7, the CPU 30 goes to the next step 98.

Here, a variation in acceleration when the player ends the operation of swinging the controller 7 will be described with reference to FIG. 20. In FIG. 20, in the acceleration history stored in the acceleration data buffer AccBuffer, a variation in acceleration when the player ends the operation of swinging the controller 7 is indicated with a solid line, and a variation in acceleration when the player continues the operation of swinging the controller 7 is indicated with a dashed line. As illustrated in FIG. 20, when the player regularly swings the controller 7, the Y-axis direction acceleration also varies in constant cycles, depending on the operation. On the other hand, when the player ends the operation of swinging the controller 7, the cycle of the variation of the Y-axis direction acceleration collapses, so that the amplitude also decreases. As a result, a time from a current time point to a first acceleration peak increases. Specifically, if the time (Index [Ms]) from the current time point to the first acceleration peak is compared with a time between acceleration peaks (Index [Ms+1]−Index[Ms]) as a reference, it is possible to detect whether or not the player has ended the operation of swinging the controller 7.

Referring back to FIG. 14, in step 88, the CPU 30 calculates the acceleration amplitude h of the acceleration history stored in the acceleration data buffer AccBuffer and updates the amplitude data Do, and goes to the next step. For example, the CPU 30 calculates the amplitude h by:

$$h = |\text{AccBuffer}[\text{index}[Ms+1]]y - \text{AccBuffer}[\text{index}[Ms]]y|.$$

In the exemplary acceleration variation of FIG. 18, the amplitude h of FIG. 18 is calculated in step 88.

Next, the CPU 30 calculates the ratio a of a time from a current time point to an acceleration peak to an interval between acceleration peaks and updates the ratio data Dp (step 89), and goes to the next step. For example, the CPU 30 calculates the ratio a by:

$$a = \text{Index}[Ms]/(\text{Index}[Ms+1] - \text{Index}[Ms]).$$

In the exemplary acceleration variation of FIG. 18, the ratio a of a time from the storage position [0] to the storage position [Index[Ms]] is calculated in step 89, where a time from the storage position [Index[Ms+1]] to the storage position [Index [Ms]] is 1. As can be seen from FIG. 18, the ratio a is a ratio of a time from a most recent acceleration peak to the current time point to half of the cycle of the acceleration variation, so that a temporal position of the current time point with respect to the cycle is calculated.

Next, in the CPU 30, it is determined whether or not the ratio a has a value of larger than 1.0 (step 90). When a>1.0, the CPU 30 sets the ratio a to be 1.0 and updates the ratio data Dp (step 91), and goes to the next step 92. On the other hand, when a≦1.0, the CPU 30 directly goes to the next step 92.

In step 92, the CPU 30 uses a sine function to calculate the cycle angle θc and updates the cycle angle data Dd, and goes to the next step. For example, the CPU 30 calculates the cycle angle θc by:

$$\theta c = q * h * \sin(\pi * a)$$

where q is a constant. Thus, the cycle angle θc at a current time point when the controller 7 is swung vertically is estimated using a temporal position (the ratio a) at the current time point, where the cyclicality of the acceleration variation is simulated by a cyclic function (here, a sine function). In other words, a state of an operation at a current time is estimated with a cyclic function using a time which has elapsed since acceleration data having a most recent maximum or minimum value was obtained.

Note that the essential principle on which the cycle angle θc is calculated is such that a motion at a current time point of the controller 7 is estimated by simulating the transition of past accelerations between acceleration peaks using a predetermined function, and substituting into the function a ratio of a time from a most recent acceleration peak to a current time point to a time between past acceleration peaks. Therefore, the cyclic function representing the cyclicality of the acceleration variation may be other cyclic functions. For example, the cyclicality of the acceleration variation may be simulated using other triangular functions, such as a cosine function and the like. When a cosine function is used, the cycle angle θc can be calculated by substituting to the function a variable obtained by adding or subtracting n*π (n is a natural number) to or from π*a.

In the above-described cyclic function, the cyclicality of the acceleration variation is used to simulate the transition of accelerations until an acceleration peak occurs next. Any other functions may be used which can estimate the acceleration transition until the next acceleration peak. For example, it may be estimated that the transition of accelerations between two acceleration peaks is approximated using a straight line, a Bezier curve, or the like, and the cycle angle θc may be calculated based on the above-described time ratio. Alternatively, the acceleration transition between two acceleration peaks may be estimated using various interpolation techniques for interpolating between two points (spline interpolation, etc.), and the cycle angle θc may be calculated based on the time ratio.

Next, the CPU 30 determines whether or not the most recent acceleration peak is a crest (i.e., a maximum value) (step 93). For example, the CPU 30 references the most recent peak type flag data Dl, and when the most recent peak type flag Ffrg=true, determines that the most recent acceleration peak is a crest. When the most recent acceleration peak is not a crest (i.e., a minimum value), the CPU 30 inverts the sign of the cycle angle θc (θc←−θc) and updates the cycle angle data Dd (step 94), and goes to the next step 95. On the other hand, when the most recent acceleration peak is a crest, the CPU 30 directly goes to the next step 95.

In step 95, the CPU 30 references the valid peak data start number data Dn to determine whether or not the valid peak data start number Ms=1. When Ms≠1, the CPU 30 inverts the sign of the cycle angle θc (θc←−θc) and updates the cycle angle data Dd (step 96), and goes to the next step 97. On the other hand, when Ms=1, the CPU 30 directly goes to the next step 97.

In step 97, the CPU 30 sets the cycle angle valid flag Cfrg to be true and updates the cycle angle valid flag data De, and ends the process of the subroutine. On the other hand, in the peak data updating process, when the number of valid acceleration peaks is less than 2 or when the player has ended the operation of swinging the controller 7 vertically, the CPU 30 executes the process of step 98. In step 98, the CPU 30 sets the cycle angle valid flag Cfrg to be false and updates the cycle angle valid flag data De, and ends the process of the subroutine.

Referring back to FIG. 11, after the cycle angle calculating process of step 19, the CPU 30 references the cycle angle valid flag data De to determine whether or not the cycle angle valid flag Cfrg is true (step 20). When the cycle angle valid flag Cfrg=false, the CPU 30 goes to the next step 21. On the other hand, when the cycle angle valid flag Cfrg=true, the CPU 30 goes to the next step 22.

In step 21, the CPU 30 calculates a new object angle $\theta$obj using the attitude angle $\theta$s indicated by the attitude angle data Dc and the object angle $\theta$obj stored in the object angle data Db and updates the object angle data Db, and goes to the next step 23. For example, the CPU 30 calculates the new object angle $\theta$obj by:

$$\theta obj \leftarrow \theta obj + (\theta s - \theta obj)*R$$

where R is a constant (e.g., R=0.8).

In step 22, the CPU 30 calculates a new object angle $\theta$obj using the cycle angle $\theta$c indicated by the cycle angle data Dd and the object angle $\theta$obj stored in the object angle data Db and updates the object angle data Db, and goes to the next step 23. For example, the CPU 30 calculates the new object angle $\theta$obj by:

$$\theta obj \leftarrow \theta obj + (\theta c - \theta obj)*R$$

where R is a constant (e.g., R=0.8).

In step 23, the CPU 30 references the object angle data Db and uses the object angle $\theta$obj to display the object OBJ which is tilted at the object angle $\theta$obj on the monitor 2, and returns to step 16 and repeats the process of step 16. For example, as illustrated in FIG. 21, the object angle $\theta$obj indicates a tilt of the object OBJ with respect to the horizontal direction in the virtual game world, and the tilt of the object OBJ is displayed which varies depending on a variation in the object angle $\theta$obj. When the object angle $\theta$obj varies in a cyclic manner, the object OBJ is operated in the virtual game world as if it were fanned around a predetermined rotational axis.

Thus, in game apparatus 3 of the embodiment above, even when the player performs an operation of swinging the controller 7, a game image can be displayed on which a motion of the controller 7 itself is reflected as appropriate. For example, even when the player rapidly swings the controller 7, angle data matching the swing operation actually performed by the player can be calculated by interpolating the transition between acceleration peaks using the cyclicality of accelerations which have been detected by the acceleration sensor, depending on the swing operation. Therefore, a motion intended by the player is expressed in a game image, and an operation is displayed in synchronization with a swing operation of the player, thereby making it possible to improve the enjoyment of the game.

Note that the essential principle on which the cycle angle $\theta$c is calculated is such that a motion at a current time point of the controller 7 is estimated by simulating the transition of past accelerations between acceleration peaks using a predetermined function, and substituting into the function a ratio of a time from a most recent acceleration peak to a current time point to a time between past acceleration peaks. Therefore, the cyclic function representing the cyclicality of the acceleration variation may be other cyclic functions. In the process above, the transition from a maximum value to a minimum value of accelerations or the transition from a minimum value to a maximum value of accelerations is simulated using a predetermined function to estimate a motion at a current time point of the controller 7. Alternatively, other peak values or the like can be used.

For example, as an acceleration peak, only one extremum of a maximum value and a minimum value may be detected. When such peak detection is executed and the transition of accelerations between peaks is simulated using a sine function, the cycle angle $\theta$c can be calculated by substituting a value obtained by multiplying $2\pi$ by the ratio a into the expression above for calculating the cycle angle $\theta$c. When such peak detection is executed and a cosine function is used to simulate the transition of accelerations between peaks, the cycle angle $\theta$c can be calculated by substituting to the function a variable obtained by adding or subtracting $n*\pi$ (n is a natural number) to or from the value obtained by multiplying $2\pi$ by the ratio a.

The cycle angle $\theta$c can be calculated by calculating the time interval between acceleration peaks at least one time. If the time interval is repeatedly updated a plurality of times, the accuracy of calculation of the cycle angle $\theta$c is improved. For example, the time interval between acceleration peaks may be calculated every time a maximum value or a minimum value is detected, or the time interval may be calculated under a predetermined condition (e.g., when a maximum value and/or a minimum value has been detected a predetermined number of times, when a predetermined time has elapsed, etc.). In the process above, the acceleration data Da is obtained every a predetermined process cycle, and the obtained cycle is used to calculate the time interval. Alternatively, data indicating a time when the acceleration data Da is output or obtained may be stored in the main memory 33, and based on the data, the time interval may be calculated.

Although it has been described above as an example that the calculated cycle angle $\theta$c or attitude angle $\theta$s is used to calculate the object angle $\theta$obj indicating the tilt of the object OBJ in the virtual game world, another game parameter indicating a state of the object OBJ may be calculated. For example, a position of the object OBJ (e.g., a position when the object OBJ is being reciprocatingly moved vertically or laterally) or the movement speed of the object OBJ in the virtual game world may be calculated using the cycle angle $\theta$c. The calculated cycle angle $\theta$c or attitude angle $\theta$s can be used to calculate various game parameters indicating a state of the object OBJ in the virtual game world.

Another object may be affected, depending on a state of the object OBJ varying depending on a game parameter calculated using the cycle angle $\theta$c or the attitude angle $\theta$s. For example, when an operation of fanning the object OBJ mimicking a fan is expressed as illustrated in FIG. 9, another object may be moved (e.g., blown out), depending on the quantity of air blown by the fan operation in the virtual game world. Since the speed or angle of fanning the object OBJ varies depending on the speed of swinging the controller 7 or the like, the operation of swinging the controller 7 affects the movement speed or the like of the other object.

The example embodiment presented herein can be implemented using an acceleration sensor which detects an acceleration only in one axial direction. For example, even when an acceleration sensor which detects and outputs only the Y-axis component (see FIGS. 3 and 4) is used, the above-described game process can be achieved. In this case, assuming that a static angle (attitude angle $\theta$s) of the controller 7 is calculated (step 18), when the detected Y-axis direction acceleration is 0, it is assumed that the controller 7 is oriented perpendicularly upward or in a vertical direction, and a direction in which the gravitational acceleration acts is simply determined, depending on the magnitude of the Y-axis direction acceleration to calculate the attitude angle $\theta$s. After the controller 7 is swung, only the magnitude of the Y-axis direction acceleration is handled based on the above-described flowchart to execute a process.

Although it has been described above as an example that output data from the acceleration sensor included in the controller 7 is used to execute a game process, output data from another sensor may be used. For example, assuming that a gyro-sensor is provided in the controller 7, if the controller 7 is swung, the cyclicality or a maximum value and a minimum value can be calculated with respect to a rotational angle of the controller 7 detected by the gyro-sensor. Therefore, if data indicating the rotational angle of the controller 7 detected by the gyro-sensor is obtained, and the process executed with respect to an output signal is changed as appropriate, the cycle angle θc and the attitude angle θs can be calculated.

Although it has been described above that the object angle θobj, the attitude angle θs, and the cycle angle θc are set where a horizontal direction in the real space or a virtual game space is a reference direction, another direction may be used as a reference direction. For example, a perpendicularly upward direction, a vertical direction, or the like in the real space or a virtual game space may be set as a reference direction.

Although it has been described above as an example that the game apparatus main body 5 which is operated by a motion of swinging the controller 7 is applied to the game system 1, an information processing apparatus, such as a general personal computer or the like, which is operated using an input device comprising an acceleration sensor, can be employed. For example, various processes can be executed based on an acceleration generated by an input device, such as a control of a state of an object displayed on an information processing apparatus, depending on acceleration data output from the acceleration sensor of the input device, and the like.

Also, in the above description, the controller 7 and the game apparatus main body 5 are connected via radio communication. Alternatively, the controller 7 and the game apparatus main body 5 may be electrically connected via a cable. In this case, a cable connected to the controller 7 is connected to a connection terminal of the game apparatus main body 5.

The above-described shape of the controller 7, and the shapes, number, positions and the like of the operation sections 72 provided therein are only for illustrative purposes. Even in the case of other shapes, numbers and positions, the example embodiment presented herein can be achieved.

The game program presented herein may be supplied to the game apparatus main body 5 not only via an external storage medium, such as the optical disc 4 or the like, but also via a wired or wireless communication line. The game program may be previously stored in a non-volatile storage device in the game apparatus main body 5. Note that examples of an information storage medium storing the game program may include a CD-ROM, a DVD, an optical disk-like storage medium similar thereto, and in addition, a non-volatile semiconductor memory.

The storage medium recording the game program of the example embodiment and the game apparatus of the example embodiment presented herein can perform a game process on which a motion of an input device itself is appropriately reflected, and are useful as a game program and a game apparatus which changes a state of a virtual object or the like, depending on a motion applied to a game controller or the like.

While the example embodiment presented herein has been described in detail, the foregoing description is in all aspects illustrative and not restrictive. It is understood that numerous other modifications and variations can be devised without departing from the scope of the example embodiment.

The game program of the present invention may be supplied to the game apparatus main body 5 not only via an external storage medium, such as the optical disc 4 or the like, but also via a wired or wireless communication line. The game program may be previously stored in a non-volatile storage device in the game apparatus main body 5. Note that examples of an information storage medium storing the game program may include a CD-ROM, a DVD, an optical disk-like storage medium similar thereto, and in addition, a non-volatile semiconductor memory.

The storage medium recording the game program of the present invention and the game apparatus of the present invention can perform a game process on which a motion of an input device itself is appropriately reflected, and are useful as a game program and a game apparatus which changes a state of a virtual object or the like, depending on a motion applied to a game controller or the like.

While the invention has been described in detail, the foregoing description is in all aspects illustrative and not restrictive. It is understood that numerous other modifications and variations can be devised without departing from the scope of the invention.

What is claimed is:

1. A non-transitory storage medium storing a game program executed by a computer in a game apparatus for executing a game, the game program causing the computer to function as:

output data obtaining programmed logic circuitry for obtaining output data varying depending on a motion of an input device itself;

output data storing programmed logic circuitry for storing a history of the output data obtained by the output data obtaining programmed logic circuitry into a memory;

peak value detecting programmed logic circuitry for detecting successive extremums of values from the output data history stored in the output data storing programmed logic circuitry;

peak interval calculating programmed logic circuitry for calculating a time interval between times when the output data indicating the successive extremums have been obtained, based on the detection of the peak value detecting programmed logic circuitry;

measurement programmed logic circuitry for measuring a time which has elapsed between the detection of a last extremum by the peak value detecting programmed logic circuitry and a present time before the detection of the next extremum;

game input data calculating programmed logic circuitry for calculating game input data by using the elapsed time measured by the measurement programmed logic circuitry and the time interval calculated by the peak interval calculating programmed logic circuitry; and game processing programmed logic circuitry for executing a game process using the game input data calculated by the game input data calculating programmed logic circuitry.

2. The non-transitory storage medium according to claim 1, wherein the peak value detecting programmed logic circuitry repeatedly detects the extremum, the peak interval calculating programmed logic circuitry calculates a time interval between a latest extremum detected by the peak value detecting programmed logic circuitry and an extremum detected immediately previously to the latest extremum, every time the peak value detecting programmed logic circuitry detects the extremum, the measurement programmed logic circuitry measures a time which has elapsed between a time point when the peak value detecting programmed logic circuitry detected the latest extremum and a present time before the detection of the next extremum, and the game input data calculating programmed logic circuitry calculates the game input data using the latest time interval calculated by the peak interval calculating programmed logic circuitry.

3. The non-transitory storage medium according to claim 1, wherein said using the elapsed time and the time interval comprises substituting said elapsed time and said time interval into a predetermined function.

4. The non-transitory storage medium according to claim 3, wherein the game input data calculating programmed logic circuitry sets as the predetermined function a cyclic function simulating transition of values indicated by the output data history which vary while successively repeating the maximum value and the minimum value with cyclicality.

5. The non-transitory storage medium according to claim 3, wherein the predetermined function used by the game input data calculating programmed logic circuitry repeatedly takes an extremum every time a variable is changed by T where T is a cycle, and takes an extremum when a predetermined value is substituted, and the game input data calculating programmed logic circuitry calculates the game input data by substituting into the predetermined function a value obtained by adding the predetermined value to a value obtained by multiplying T by a ratio of the elapsed time to the time interval.

6. The non-transitory storage medium according to claim 5, wherein the predetermined function used by the game input data calculating programmed logic circuitry is a sine function, the peak value detecting programmed logic circuitry detects either a maximum or a minimum value, the peak interval calculating programmed logic circuitry calculates either a time interval between successive maximum values or a time interval between successive minimum values, and the game input data calculating programmed logic circuitry calculates the game input data by substituting a value obtained by multiplying 360 degrees by the ratio into the sine function.

7. The non-transitory storage medium according to claim 5, wherein the predetermined function used by the game input data calculating programmed logic circuitry is a cosine function, the peak value detecting programmed logic circuitry detects either a maximum or a minimum value, the peak interval calculating programmed logic circuitry calculates either a time interval between successive maximum values or a time interval between successive minimum values, and the game input data calculating programmed logic circuitry calculates the game input data by substituting into the cosine function a value obtained by adding or subtracting n*π, where n is a natural number, to or from a value obtained by multiplying 360 degrees by the ratio.

8. The non-transitory storage medium according to claim 3, wherein the predetermined function used by the game input data calculating programmed logic circuitry is a function which repeatedly takes a maximum value and a minimum value alternately every time a variable is changed by T/2 where T is a cycle, the peak value detecting programmed logic circuitry detects both the maximum value and the minimum value, the peak interval calculating programmed logic circuitry calculates a time interval between the successive maximum value and minimum value, the game input data calculating programmed logic circuitry calculates the game input data by substituting into the predetermined function a value obtained by adding a predetermined value to a value obtained by multiplying T/2 by a ratio of the elapsed time to the time interval.

9. The non-transitory storage medium according to claim 8, wherein the predetermined function of the game input data calculating programmed logic circuitry is a function which takes a maximum value or a minimum value when a predetermined value is substituted, the peak value detecting programmed logic circuitry repeatedly detects the maximum value and the minimum value, the peak interval calculating programmed logic circuitry calculates a time interval between a latest maximum value detected by the peak value detecting programmed logic circuitry and a minimum value detected immediately previously to the latest maximum value or between a latest minimum value detected by the peak value detecting programmed logic circuitry and a maximum value detected immediately previously to the latest minimum value, every time the peak value detecting programmed logic circuitry detects either the maximum value or the minimum value, the measurement programmed logic circuitry measures a time which has elapsed between a time point at which the peak value detecting programmed logic circuitry detected the latest maximum or minimum value and a present time before the detection of the next extremum, the game input data calculating programmed logic circuitry calculates the game input data using the latest time interval calculated by the peak interval calculating programmed logic circuitry, and when the latest extremum detected by the peak value detecting programmed logic circuitry is a minimum value, inverts the sign of the calculated game input data.

10. The non-transitory storage medium according to claim 8, wherein the predetermined function used by the game input data calculating programmed logic circuitry is a sine function, and the game input data calculating programmed logic circuitry calculates the game input data by substituting a value obtained by multiplying 180 degrees by the ratio into the sine function.

11. The non-transitory storage medium according to claim 8, wherein the predetermined function used by the game input data calculating programmed logic circuitry is a cosine function, and the game input data calculating programmed logic circuitry calculates the game input data by substituting into the cosine function a value obtained by adding or subtracting n*180 degrees, where n is a natural number, to or from a value obtained by multiplying $\pi$ by the ratio.

12. The non-transitory storage medium according to claim 3, wherein
the input device includes an acceleration detecting element for detecting accelerations generated in at least two directions, and outputting a result of the detection as output data, and
the output data obtaining programmed logic circuitry obtains data indicating accelerations generated in two directions based on the output data output from the acceleration detecting element.

13. The non-transitory storage medium according to claim 12, wherein
the game is a game in which a player performs an operation of reciprocally tilting the input device, and
one of the at least two directions in which accelerations are detected by the acceleration detecting element, is a direction in which, when the player performs the operation of reciprocally tilting the input device, an acceleration is generated due to an operational force of the operation.

14. The non-transitory storage medium according to claim 12, wherein
the game is a game in which a player performs an operation of reciprocally tilting the input device, and
one of the at least two directions in which accelerations are detected by the acceleration detecting element, is a tangential direction of an arc which is a trajectory of movement of a predetermined portion of the input device by the operation of reciprocally tilting the input device performed by the player.

15. The non-transitory storage medium according to claim 12, wherein
when the peak value detecting programmed logic circuitry has detected n, where n is an integer of 2 or more, extremums, the game input data calculating programmed logic circuitry calculates the game input data by substituting into the predetermined function the elapsed time measured by the measurement programmed logic circuitry and the time interval calculated by the peak interval calculating programmed logic circuitry,
when the peak value detecting programmed logic circuitry has not detected n extremums, the game input data calculating programmed logic circuitry calculates angle data indicating an angle of the input device with respect to a direction of gravity acting on the input device based on the accelerations generated in the two directions indicated by the output data, and the angle data is the game input data.

16. The non-transitory storage medium according to claim 15, wherein
the game is a game in which the input device is reciprocally tilted while the input device is disposed so that the two directions are present in a vertical plane in a real space.

17. The non-transitory storage medium according to claim 12, wherein
the game program causes the computer to further function as:
determination programmed logic circuitry for determining whether or not the elapsed time measured by the measurement programmed logic circuitry reaches a value larger than or equal to n, where n>1, times the time interval calculated by the peak interval calculating programmed logic circuitry, and
when s the elapsed time is larger or equal to n times the time interval, the game input data calculating programmed logic circuitry calculates angle data indicating an angle of the input device with respect to a direction of gravity acting on the input device based on the accelerations generated in the two directions indicated by the output data, and the angle data is the game input data.

18. The non-transitory storage medium according to claim 3, wherein
the peak value detecting programmed logic circuitry detects both a maximum value and a minimum value,
the game program causes the computer to further function as:
difference calculating programmed logic circuitry for calculating a difference between the maximum value and the minimum value detected by the peak value detecting programmed logic circuitry, and
the predetermined function used by the game input data calculating programmed logic circuitry is a cyclic function whose amplitude has a value based on the difference value calculated by the difference calculating programmed logic circuitry.

19. The non-transitory storage medium according to claim 1, wherein
the game is a game in which a player performs an operation of reciprocally tilting the input device, and
the game program causes the computer to further function as:
end determining programmed logic circuitry for determining that the operation of reciprocally tilting the input device has been ended, when the elapsed time measured by the measurement programmed logic circuitry reaches a predetermined value times the time interval calculated by the peak interval calculating programmed logic circuitry.

20. The non-transitory storage medium according to claim 19, wherein
the game program causes the computer to further function as:
attitude calculating programmed logic circuitry for calculating an attitude of the input device itself using a value indicated by latest output data obtained by the output data obtaining programmed logic circuitry when the end determining programmed logic circuitry determines that the operation of reciprocally tilting the input device has been ended, and
the game input data calculating programmed logic circuitry calculates the game input data using the attitude calculated by the attitude calculating programmed logic circuitry when the end determining programmed logic circuitry determines that the operation of reciprocally tilting the input device has been ended.

21. The non-transitory storage medium according to claim 1, wherein
the game is a game in which a player performs an operation of reciprocally tilting the input device, and
the game program causes the computer to further function as:
stop determining programmed logic circuitry for determining that the operation of reciprocally tilting the input device is not being performed, when the peak value detecting programmed logic circuitry has detected one or less extremum.

22. The non-transitory storage medium according to claim 21, wherein
the game program causes the computer to further function as:
attitude calculating programmed logic circuitry for calculating an attitude of the input device itself using a value indicated by latest output data obtained by the output data obtaining programmed logic circuitry when the stop determining programmed logic circuitry determines that the operation of reciprocally tilting the input device is not being performed, and the game input data calculating programmed logic circuitry calculates the game input data using the attitude calculated by the attitude calculating programmed logic circuitry when the stop determining programmed logic circuitry determines that the operation of reciprocally tilting the input device is not being performed.

23. The non-transitory storage medium according to claim 1, wherein
the game processing programmed logic circuitry varies a tilt of an object in a virtual game world using the game input data, and
the game program causes the computer to further function as:
display control programmed logic circuitry for tilting the object in the virtual game world, depending the tilt of the object varied by the game processing programmed logic circuitry, and displaying the tilted object on a display device.

24. The non-transitory storage medium according to claim 1, wherein
the game processing programmed logic circuitry changes an influential power on a surrounding environment, the influential power being generated by movement of an object in a virtual game world using the game input data, so as to provide a predetermined influence on another object in the virtual game world, depending on the influential power.

25. A non-transitory storage medium storing a game program executed by a computer in a game apparatus for executing a game, the game program causing the computer to function as:
output data obtaining programmed logic circuitry for obtaining output data varying depending on a motion of an input device itself;
output data storing programmed logic circuitry for storing a history of the output data obtained by the output data obtaining programmed logic circuitry into a memory;
peak value detecting programmed logic circuitry for detecting successive extremums of values from the output data history stored in the output data storing programmed logic circuitry;
peak interval calculating programmed logic circuitry for calculating a time interval between times when the output data indicating the successive extremums have been obtained, based on the detection of the peak value detecting programmed logic circuitry;
measurement programmed logic circuitry for measuring a time which has elapsed since the detection of the extremum by the peak value detecting programmed logic circuitry;
game input data calculating programmed logic circuitry for calculating game input data by substituting into a predetermined function the elapsed time measured by the measurement programmed logic circuitry and the time interval calculated by the peak interval calculating programmed logic circuitry; and
game processing programmed logic circuitry for executing a game process using the game input data calculated by the game input data calculating programmed logic circuitry, wherein
the predetermined function used by the game input data calculating programmed logic circuitry is a sine function or a cosine function having a cycle which is half of the time interval calculated by the peak interval calculating programmed logic circuitry.

26. A game apparatus for executing a game, comprising:
output data obtaining programmed logic circuitry for obtaining output data varying depending on a motion of an input device itself;
output data storing programmed logic circuitry for storing a history of the output data obtained by the output data obtaining programmed logic circuitry into a memory;
peak value detecting programmed logic circuitry for detecting successive extremums of values from the output data history stored in the output data storing programmed logic circuitry;
peak interval calculating programmed logic circuitry for calculating a time interval between times when the output data indicating the successive extremums have been obtained, based on the detection of the peak value detecting programmed logic circuitry;
measurement programmed logic circuitry for measuring a time which has elapsed between the detection of a last extremum by the peak value detecting programmed logic circuitry and a present time before the detection of the next extremum;
game input data calculating programmed logic circuitry for calculating game input data by using the elapsed time measured by the measurement programmed logic circuitry and the time interval calculated by the peak interval calculating programmed logic circuitry; and
game processing programmed logic circuitry for executing a game process using the game input data calculated by the game input data calculating programmed logic circuitry.

27. A computer implemented method for executing a game, the method comprising:
obtaining, via one or more processing devices, output data varying depending on a motion of an input device itself;
storing a history of the obtained output data into a memory;
detecting successive extremums of values from the stored output data history;
calculating a time interval between times when the output data indicating the successive extremums have been obtained, based on the detection of the peak value;
measuring a time which has elapsed between the detection of a last extremum and a present time before the detection of the next extremum;
calculating game input data by using the measured elapsed time and the time interval; and
executing a game process using the calculated game input data.

28. A game apparatus for executing a game, said game apparatus comprising a processing system, including one or more computer processors configured to:
obtain output data varying depending on a motion of an input device itself;
store a history of the obtained output data into a memory;
detect a peak value for detecting successive extremums of values from the stored output data history;
calculate a peak interval for calculating a time interval between times when the output data indicating the successive extremums have been obtained, based on the detected peak value;
measure a time which has elapsed between the detection of a last extremum and a present time before the detection of the next extremum;
calculate game input data by using the measured elapsed time and the time interval calculated by the peak interval calculating; and
execute a game process using the calculated game input data.

* * * * *